US011467342B1

(12) United States Patent
Bhandari

(10) Patent No.: US 11,467,342 B1
(45) Date of Patent: Oct. 11, 2022

(54) MODE CONVERTER AND METHOD FOR GENERATING AN OPTICAL ORBITAL ANGULAR MOMENTUM MODE OF A TOPOLOGICAL CHARGE OF OPPOSITE SIGN

(71) Applicant: The Government of the United States as represented by the Director, National Security Agency, Ft. George G. Meade, MD (US)

(72) Inventor: Ramesh Bhandari, Adelphi, MD (US)

(73) Assignee: Government of the United States as represented by the National Security Agency

( * ) Notice: Subject to any disclaimer, the term of this patent is extended or adjusted under 35 U.S.C. 154(b) by 0 days.

(21) Appl. No.: 17/326,524

(22) Filed: May 21, 2021

Related U.S. Application Data

(60) Provisional application No. 63/028,936, filed on May 22, 2020.

(51) Int. Cl.
*G02B 6/14* (2006.01)
*H04B 10/25* (2013.01)
(Continued)

(52) U.S. Cl.
CPC ............. *G02B 6/14* (2013.01); *G02B 6/4457* (2013.01); *H04B 10/25* (2013.01); *H04B 10/516* (2013.01)

(58) Field of Classification Search
CPC ........ G02B 6/14; G02B 6/4457; H04B 10/25; H04B 10/516
(Continued)

(56) References Cited

U.S. PATENT DOCUMENTS 10,084,541 B2 * 9/2018 Ashrafi .............. H04B 10/2581
10,168,501 B2 * 1/2019 Ashrafi ................ G02B 6/2726
(Continued)

OTHER PUBLICATIONS

Yang Yue et al., "Mode Properties and Propagation Effects of Optical Orbital Angular Momentum (OAM) Modes in a Ring Fiber" vol. 4, No. 2, Apr. 2012 (Year: 2012).*
(Continued)

*Primary Examiner* — Abbas H Alagheband

(57) ABSTRACT

The present invention provides a method for converting the topological charge of an orbital angular momentum mode of light to an opposite topological charge by applying the light to a spool of optical fiber having a bend radius R and length L. The length of the fiber used to form the spool is defined by ½ the bend-induced $2\pi$ walk-off length $L_{l,m}^{b(2\pi)}$. The length of the fiber L and the bend radius R of the spool may be adjusted to account for an ellipticity-induced $2\pi$ walk-off length $L_{l,m}^{3(2\pi)}$. Using the proportionality rules, $L_{l,m}^{b(2\pi)} \propto R^{2l}$ and $L_{l,m}^{3(2\pi)} \propto \varepsilon^{-l}$ adjustments to account for ellipticity induced $2\pi$ walk-off length $L_{l,m}^{e(2\pi)}$, or to account for a change in the bend radius $\Delta R$ of the spool can be easily determined.

23 Claims, 15 Drawing Sheets

(51) Int. Cl.
*H04B 10/516* (2013.01)
*G02B 6/44* (2006.01)

(58) Field of Classification Search
USPC .......................................... 398/183
See application file for complete search history.

(56) References Cited

U.S. PATENT DOCUMENTS

| | | | | |
|---|---|---|---|---|
| 2009/0059352 | A1* | 3/2009 | Fini | H01S 3/06754 |
| | | | | 359/337 |
| 2015/0104139 | A1* | 4/2015 | Brunet | G02B 6/03666 |
| | | | | 385/124 |
| 2018/0306716 | A1* | 10/2018 | Ashrafi | G01N 21/59 |
| 2021/0133614 | A1* | 5/2021 | Ashrafi | G06N 10/00 |

OTHER PUBLICATIONS

Alexeyev, C.N. et al., Spin-orbit interaction in a generic vortex field transmitted through an elliptic fiber, Semiconductor Physics, Quantum Electronics & Optoelectronics, 2000, p. 500-513, vol. 3, No. 4, Institute of Semiconductor Physics, National Academy of Sciences of Ukraine.

Garth, S.J., Modes on a bent optical waveguide, IEE Proceedings J (Optoelectronices), 1987, p. 221-229, vol. 134, No. 4, Institution of Electrical Engineers, United Kingdom.

Chen, S. et al., Theoretical analyses on orbital angular momentum modes in conventional graded-index multimode fibre, Scientific Reports 7, 2017, Article No. 3990, Nature Research, United Kingdom.

Gregg, P., et al., Conservation of orbital angular momentum in air-core optical fibers, Optica, 2015, p. 267-270, vol. 2, No. 3, Optical Society of America, USA.

Marcuse, D., Field deformation and loss caused by curvature of optical fibers, Journal of the Optical Society of America, 1976, p. 311-320, vol. 66, Issue 4, Optical Society of America, USA.

Yue, Y. et al., Mode Properties and Propagation Effects of Optical Orbital Angular Momentum (OAM) Modes in a Ring Fiber, IEEE Photonics Journal, 2012, p. 535-543, vol. 4, No. 2, IEEE Photonics Society, Institute of Electrical and Electronics Engineers, Inc, USA.

* cited by examiner

MODE CONVERTER AND METHOD FOR GENERATING AN OPTICAL ORBITAL ANGULAR MOMENTUM MODE OF A TOPOLOGICAL CHARGE OF OPPOSITE SIGN

RELATED APPLICATIONS

This application claims the benefit of U.S. Provisional Patent Application 63/028,936 filed on May 22, 2020 the disclosure of which is incorporated by reference.

BACKGROUND OF THE INVENTION

Ever since the revival of interest in orbital angular momentum (OAM) modes of light, research on OAM mode propagation in a dielectric waveguide such as a multimode fiber has increased significantly. In commercial telecommunications, internet, and data centers, the orthogonality of the OAM modes leads to the possibility of multifold increase in traffic flow within a fiber by stacking traffic into different OAM modes of the same wavelength. Each OAM mode, denoted $OAM_{l,m}$, is characterized by a topological charge, an integer denoted I, and a radial index m, an integer greater than unity; parameter l physically signifies an OAM of $l\hbar$ per photon within the OAM beam. In what follows, we denote negative topological charges by placing an explicit minus sign in front of l, e.g., −l. The $OAM_{l,m}$ mode also carries polarization.

A commercial fiber in general is characterized by a core and cladding of different radii and refractive indices. FIG. 1a illustrates the cross-sectional view of a step-index fiber 10 with core radius a and cladding radius b ($\gg$a). r and θ along with the z coordinate (z axis coincident with the fiber axis) constitute the cylindrical polar coordinates and the mode is assumed propagating in the +z direction (out of the plane of the paper). The refractive index n(r) of the fiber is a function of the radial distance r only, and is illustrated for the step-index fiber in FIG. 1b, where $n_1$ and $n_2$ denote the refractive index of the core and cladding, respectively. In general, $n^2(r)=n_1^2(1-2\Delta f(r))$, where f(r) is the index profile function and Δ is the index profile height parameter given by $$\Delta = \frac{(n_1^2 - n_2^2)}{2n_1^2};$$

$n_1$ the highest refractive index value within the core. For the step-index fiber illustrated here, f(r), is a step function, equal to 1 for r≥a and equal to 0 for r≤a. For gradient-index fiber, f(r) is a function=$r^2$ for r≤a and is a function=1 for r≥a.

In commercial fibers, where Δ≪1, an $OAM_{l,m}$ mode belongs to a quartet of degenerate modes: $\phi_{l,m}\vec{\in}_+$, $\phi_{-l,m}\vec{\in}_-$, $\phi_{l,m}\vec{\in}_-$, $\phi_{-l,m}\vec{\in}_+$. Each mode within the quartet has the same propagation constant, denoted by $\beta_{l,m}$. $\vec{\in}_\pm=1/\sqrt{2}(\hat{x}\pm i\hat{y})$ represents left-circularly (+ sign) polarized light and right-circularly (− sign) polarized light. The spatial wave function, $\phi_{l,m}$, is written as:

$$\phi_{l,m}(r,\theta,z)=O_{l,m}(r,\theta)e^{i\beta_{l,m}z}, \quad \text{[Equation 1]}$$

where $O_{l,m}$, the amplitude, is an eigenvalue solution of the scalar wave equation (i.e., the eigenamplitude):

$$HO_{l,m}(r,\theta)=\beta_{l,m}^2 O_{l,m}(r,\theta). \quad \text{[Equation 2]}$$

The Hermitian operator H is provided by:

$$H=\vec{\nabla}_t^2+k^2n^2(r). \quad \text{[Equation 3]}$$

For the step-index fiber illustrated in FIGS. 1a and 1b, H is equal to $\vec{\nabla}_t^2+k^2n_1^2$ for r≤α (core radius) and equal to $\vec{\nabla}_t^2+k^2n_2^2$ for r≥α (see FIG. 1b); k=2π/λ, where λ is the wavelength of light; $\vec{\nabla}_t^2$ is the transverse Laplacian: $\partial^2/\partial r^2 + (1/r)\partial/\partial r + (1/r^2)\partial^2/\partial\theta^2$. The amplitude, $O_{l,m}(r, \theta)$, of the electric field in the step-index fiber is given by:

$$O_{l,m}(r,\theta) = \frac{1}{\sqrt{N_{l,m}}} J_l(p_{l,m}r)e^{il\theta} \quad \text{for } r \le a \quad \text{[Equation 4]}$$

$$= \frac{1}{\sqrt{N_{l,m}}} \frac{J_l(p_{l,m}a)}{K_l(q_{l,m}a)} K_l(q_{l,m}r)e^{il\theta} \quad \text{for } r \ge a.$$

$N_{l,m}$ is the normalization constant given by $$N_{l,m} = \int_0^\infty \int_0^{2\pi} O_{l,m}^*(r,\theta)O_{l,m}(r,\theta)rdrd\theta;$$

$$p_{l,m} = \sqrt{k^2n_1^2 - \beta_{l,m}^2} \text{ and } q_{l,m} = \sqrt{\beta_{l,m}^2 - k^2n_2^2}. \quad O_{l,m}(r,\theta)$$

always characterized by an exponential azimuthal dependence regardless of the refractive index profile, is referred to as the amplitude (or the field profile) of the $OAM_{l,m}$ mode. The wave propagation constants $\beta_{l,m}$ are computed from the characteristic equation corresponding to these modes. The amplitude $O_{-l,m}(r, \theta)$ corresponding to the $OAM_{-l,m}$ mode is also given by [Equation 4], except that $e^{il\theta}$ is replaced with $e^{-il\theta}$; here $\beta_{-l,m}=\beta_{l,m}$; as a result, $OAM_{-l,m}$ mode is often termed as the degenerate partner of the $OAM_{l,m}$ mode.

A general drawback in practical fibers is the presence of imperfections such as ellipticity due to manufacturing defects. This ellipticity is illustrated in FIG. 2 with respect to a fiber 9 with core radius a and cladding radius (not illustrated) b($\gg$a). The cross-section of an imperfect, elliptically-shaped core is illustrated in FIG. 2 relative to an ideal, circularly-shaped core 11 (illustrated by a dashed line). The elliptical core 9 is defined by a semi-major axis $\rho_1=a(1+\in)$ and semi-minor axis $\rho_2=a(1-\in)$ where ellipticity $\in=e^2/4\ll1$ and e is the eccentricity of the ellipse. This ellipticity can generate extraneous modes within the fiber. The conversion of an input mode into its degenerate partner using fiber ellipticity has been noted in the context of very low values of topological charge l, specifically for l=1. See, C. N. Alexeyev, et al, "Spin-orbit interaction in a generic vortex field transmitted through an elliptic fiber", Semicond Phys. Quantum Electron. & Optoelectron., vol. 3, p. 501-513 (2000). This limited theoretical ellipticity-based OAM mode converter becomes complex and intractable for higher values of l, the application of this limited ellipticity-based OAM converter to higher values of l was not addressed by Alexeyev, et al. Furthermore, the theoretical ellipticity-based mode converter is confined to a straight fiber. The requirement that a fiber be kept straight (i.e. without bends) is impractical especially if the length of the fiber is large and therefore would be difficult to implement for OAM mode conversion.

Previous studies of the impact of fiber bends have not explicitly considered OAM modes or have not adequately addressed them. For example, Garth in *Modes on a bent optical waveguide*, IEE proc., vol. 134, Pt. J, no 4, pp.

221-229, August 1987, provides a perturbative approach for the study of the modal fields in the presence of a bend; his work is primarily confined to the single mode fiber (l=0) and Linearly Polarized (LP) modes corresponding to very low l values (these modes do not carry any OAM). In *Theoretical Analysis On Orbital Angular Momentum Modes In Conventional Graded-index Multimode Fibre*, Scientific Reports, 21 Jun. 2017, Chen and Wang perform a numerical study of the impact of a bend on OAM mode propagation distance. Gregg et al. in *Conservation of orbital angular momentum in air-core optical fibers*, Optica Vol. 2, pp. 267-270, 2015 use small bend angles and recognize the absence of high/value degenerate OAM modes due to bends in an air-core fiber.

SUMMARY OF THE INVENTION

Briefly, the present invention provides a method for converting the topological charge of an orbital angular momentum mode of light to an opposite topological charge by applying the light to a spool of optical fiber having a bend radius R and length L.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 1b illustrates a refractive index profile of the optical fiber illustrated in FIG. 1a;

DESCRIPTION OF THE INVENTION

Figure 1A:
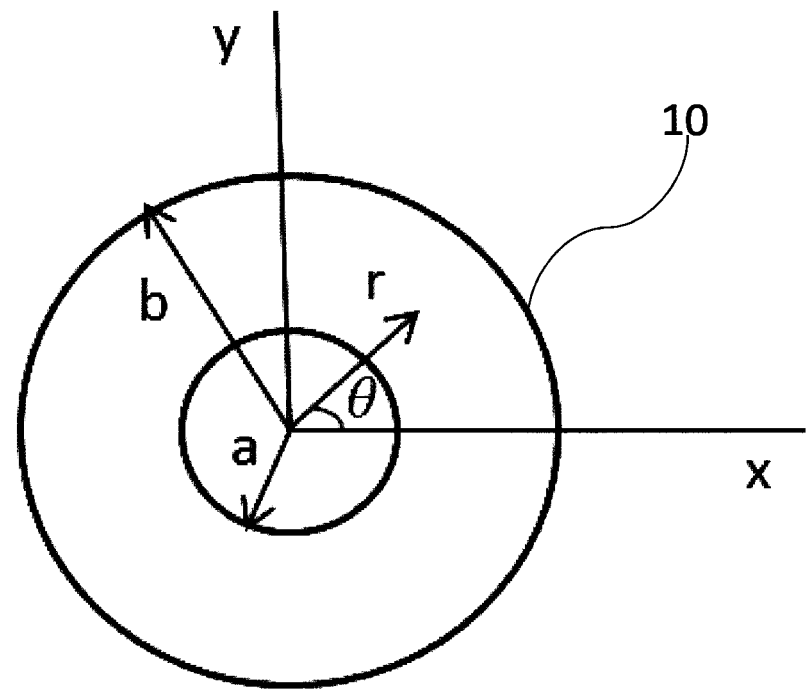
FIG. 1a illustrates a cross sectional view of the core and cladding of an ideal optical fiber.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

As noted above, each mode of light $OAM_{l,m}$ is characterized by a topological charge l and a radial index m. The topological charge l is an integer equal or greater than zero and can also assume negative values, where the negative values are indicated by placing an explicit minus sign in front of l, e.g. -l. The radial index m is a positive integer whose maximum value for a given topological charge l is determined by the characteristics of the fiber (e.g. core radius a, refractive index $n_1$ and $n_2$, index profile function f(r), and the wavelength $\lambda$ of light used). Each photon is considered to carry an OAM equal to $l\ h/(2\pi)$, where h is Planck's constant. OAM modes with different values of (l, m) are orthogonal to each other. The invention utilizes a bent fiber to cause the conversion of an input OAM mode of topological charge l into its degenerate partner characterized by -l. The present invention provides a quantitative treatment of the conversion of the spatial OAM modes using perturbation theory specifically developed to address the mixing (generation) of the modes due to bends and ellipticity.

Figure 3:
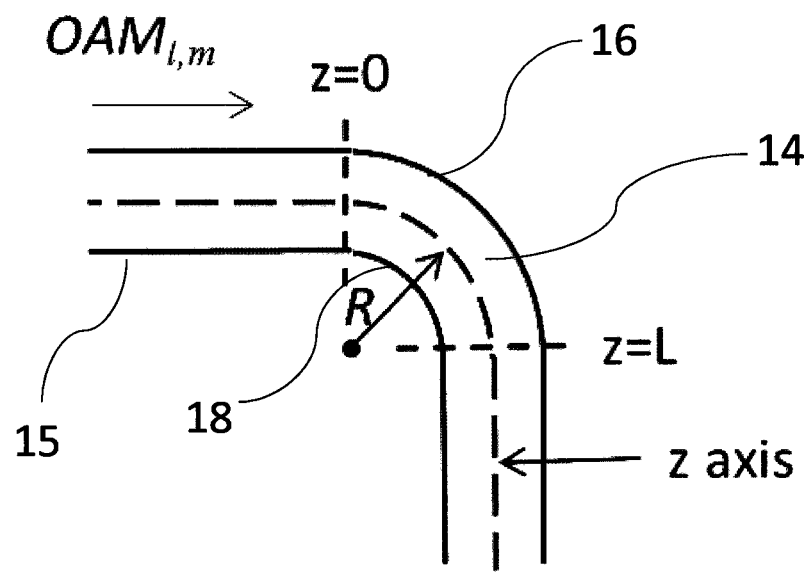
FIG. 3 illustrates bent optical fiber having a bend radius, R.

Considering for the moment only the impact of a bend 14 of length L, having an outer edge 16 and an inner edge 18 as illustrated in FIG. 3. When the light enters this bend, the mode of the light changes thereby creating a degenerate mode. More specifically, as the light travels through the bent fiber, the input $OAM_{l,m}$ mode experiences a bend-induced torque, which gradually changes its orbital angular momentum, i.e. its topological charge, from l to -l and back into itself and so on depending on the length L of the bend. The transformation begins at the starting point of the bend (z=0) and continues until the bend stops (z=L).

Figure 4:
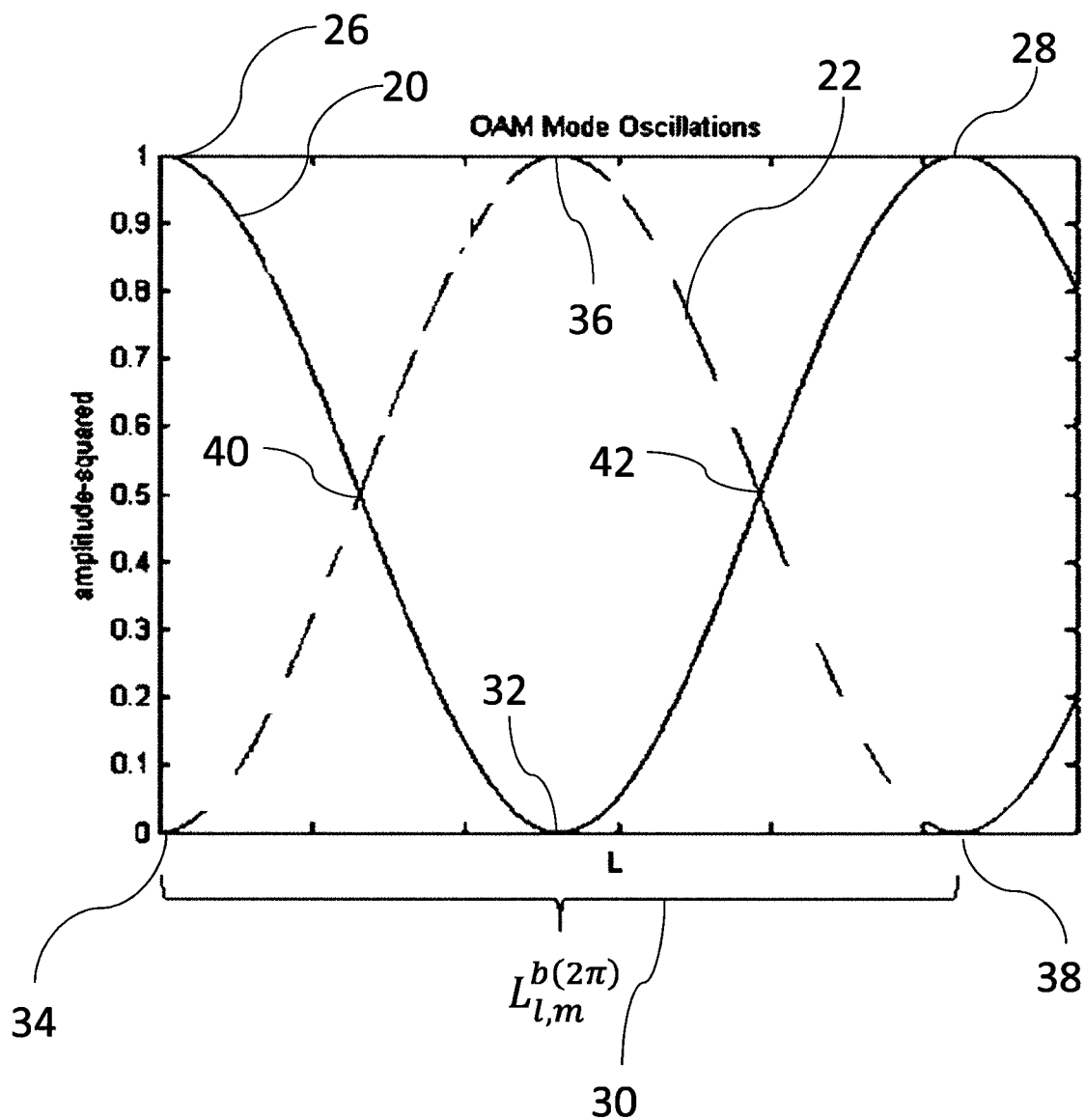
FIG. 4 illustrates OAM mode oscillations over a length of bent fiber including oscillations of an input mode and oscillations of the converted degenerate mode.

FIG. 4 illustrates the transformation or conversion of the input mode $OAM_{l,m}$ to mode $OAM_{-l,m}$ as a function of the length of the fiber bend. More specifically, FIG. 4 includes a plot 20 of the amplitude-squared versus the length of the bend relating to the $OAM_{l,m}$ mode (i.e., the input mode, illustrated with a solid line), and also includes a plot 22 of the amplitude-squared versus the length of the fiber relating to the $OAM_{-l,m}$ mode (illustrated with a dashed line). For a bend of length L>0, the input mode $OAM_{l,m}$ is at a maximum 26 before its entry into the bend as illustrated by the solid line in FIG. 4. As the light travels along the length L of the bend, the amplitude of the applied (input) mode $OAM_{l,m}$ starts to decrease, while the amplitude of the degenerate partner $OAM_{-l,m}$ starts to increase; during this conversion process, energy is conserved. For larger values of L, the amplitude of $OAM_{l,m}$ decreases to 0 and then returns to its maximum 28. The length of the bend over which the amplitude-squared (proportional to intensity) decreases to 0 and returns to its maximum is referred to as the $2\pi$ walk-off length 30, $L_{l,m}^{b(2\pi)}$. As illustrated, the input mode $OAM_{l,m}$ is at its minimum 32 (zero) at a bend length L equal to ½ of the $2\pi$ walk-off length.

As illustrated by the dashed line in FIG. 4 the amplitude-squared of the converted mode $OAM_{-l,m}$ is zero prior to the bend 34, but, as the bend length L increases, the amplitude of the converted mode $OAM_{-l,m}$ (i.e. the degenerate mode) begins to rise and increase until it reaches its maximum 36 at a length equal to ½ of the $2\pi$ walk-off length and then returns to zero at the $2\pi$ walk-off length $L_{l,m}^{b(2\pi)}$ 38. The amplitudes of the input mode $OAM_{l,m}$ and the converted mode $OAM_{-l,m}$ are equal at ¼ of the $2\pi$ walk-off length (see, intersection 40) and again at ¾ of the $2\pi$ walk-off length (see, intersection 42). At L=½ of the $2\pi$ walk-off length 32, the input mode of the light having a topological charge of 1 is completely converted to light having a topological charge of −1 (i.e. the degenerate mode); the above cycle repeats itself at integral multiples of the $2\pi$ walk-off length, i.e., the conversion of the input $OAM_{l,m}$ mode into its degenerate partner, $OAM_{-l,m}$ is achieved at $$L = L_{l,m}^{b(2\pi)}\left(n + \frac{1}{2}\right),$$

where integer n≥0. Thus, once the $2\pi$ walk-off length $L_{l,m}^{(2\pi)}$ 30 is determined, a length of fiber L required to completely convert the input mode of light to the degenerate mode can be determined. Using this length of fiber L, a mode converter is provided. The inventor's paper titled, *Orbital Angular Momentum (OAM) Mode mixing in a Bent step Index Fiber in Perturbation Theory*, IEEE Photonics Journal, Vol. 11 No. 3, June 2019 provides a complete documentation of the rigorously developed perturbation theory, which yields the formula for the $2\pi$ walk-off length and is given by:

$$L_{l,m}^{b(2\pi)} = \frac{2\pi}{\Delta\beta'_{l,m}};\qquad\text{[Equation 5]}$$

where $\Delta\beta'_{l,m}=\beta'^{+}_{l,m}-\beta'^{-}_{l,m}$, and $\beta'^{+}_{l,m}$ and $\beta'^{-}_{l,m}$ are propagation constants of the eigenmodes of the bent fiber for the specified topological charge l and radial index m.

The $OAM_{l,m}$ mode of the signal entering the bend oscillates into and out of the $OAM_{-l,m}$ mode with a $2\pi$ walk-off length as depicted in FIG. 4. Further, $$\Delta\beta'_{l,m} = \frac{\Delta\beta'^{2}_{l,m}}{2\beta_{l,m}},$$

where $\Delta\beta'^{2}_{l,m}$ is given by:

[Equation 7]

$$\Delta\beta'^{2}_{l,m} = 2\sigma^{2l}\Sigma\frac{\delta H_{(l,m)(l-1,n)}\delta H_{(l-1,n)(l-2,k)}\cdots H_{(1,i)(0,j)}\delta H_{(0,j)(-1,p)}\cdots \delta H_{(-l+2,r)(-l+2,s)}\delta H_{(-l+1,s)(-l,m)}}{(\beta^2_{l,m}-\beta^2_{l-1,n})(\beta^2_{l,m}-\beta^2_{l-2,k})\cdots(\beta^2_{l,m}-\beta^2_{0,j})\cdots (\beta^2_{l,m}-\beta^2_{-l+2,r})(\beta^2_{l,m}-\beta^2_{-l+2,s})},$$

The summation Σ on the right-hand-side of Equation 6 indicates summation over the repeated indices, such as n, k, j, p, r and s, signifying inclusion of all radial mode solutions for all considered topological charges (i.e., all radial mode solutions for all topological charges related by the selection rule, Δl=±1 except for the topological charges 1 and −1,) in the above summation. The number of bend-induced matrix elements in the numerator is 2l+1 and the number of propagation constant-squared differences in the denominator is 2l. From [Equation 5], [Equation 6] and [Equation 7] and from the fact that bend perturbation parameter σ=a/R (<<1), we see that $L_{l,m}^{(2\pi)}$ is proportional to $R^{2l}$, for the same l and m.

Figure 1B:
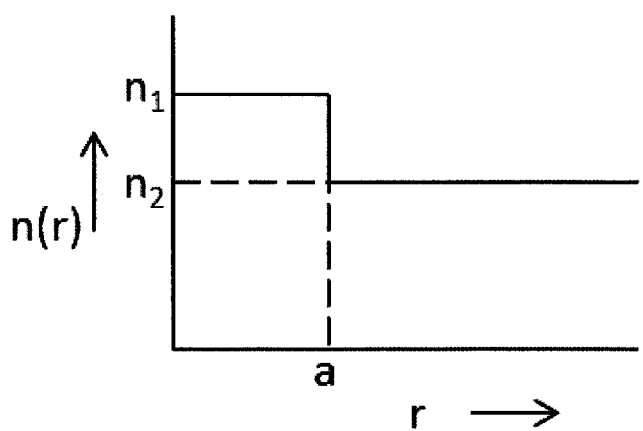
Figure 2:
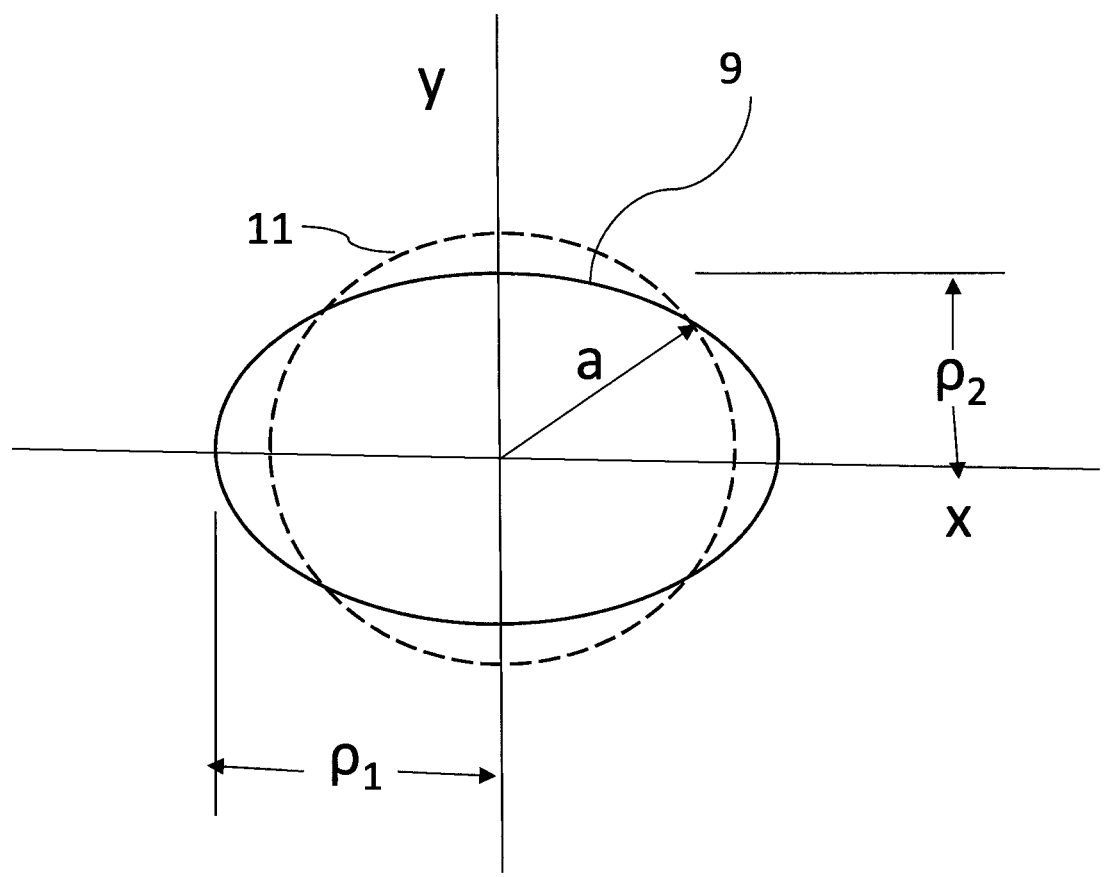
FIG. 2 illustrates a cross sectional view of an elliptical-shaped core of an optical fiber relative to an ideal circularly-shaped core.
Figure 5:
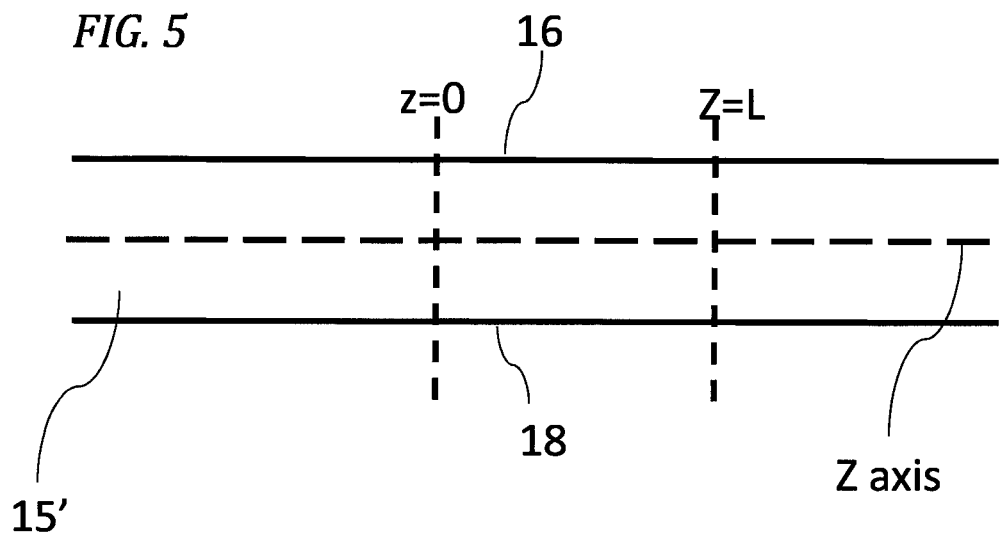
FIG. 5 illustrates a previously bent fiber in a straightened state as used for purpose of modeling.
Figure 6:
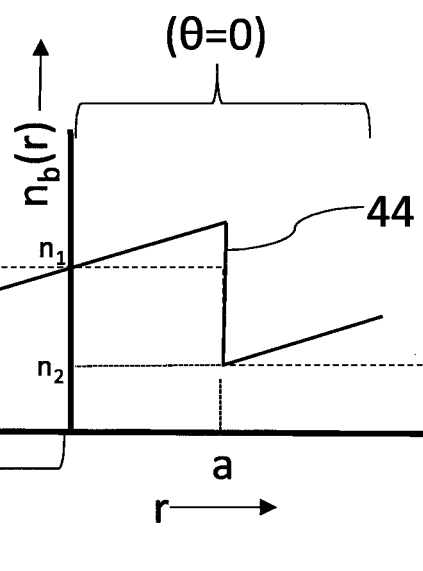
FIG. 6 illustrates a refractive index profile of a bent step-index fiber.

The crux of [Equation 7] is the modeling of the bent fiber illustrated in FIG. 3 as a straight fiber with a modified refractive index profile. FIG. 5 illustrates the previously bent fiber 15 of FIG. 3 as straightened fiber 15' for the purpose of modeling. FIG. 6 illustrates the modified refractive index profile 44 of the straightened fiber 15' in accordance with a well-known formula. As described by D. Marcuse in *Field Deformation and Loss Caused By Curvature of Optical Fibers*, J. Opt. Soc. Amer., vol. 66, pp. 311-320, 1976, when a straight fiber is bent into a fiber of bend radius R>>α, wave propagation through the bent fiber 15 is modeled as wave propagation through a straight fiber with an equivalent refractive index profile given by $$n_b^2(r,\theta)=n^2+2n^2(r/R)\cos\theta,\qquad\text{[Equation 8]}$$

where for the step-index fiber, $n^2(r)=n_1^2$ for r≤α (i.e. the core) and $n^2(r)=n_2^2$ for r≥α (see FIG. 1b). The equivalent refractive index $n_b$ depends upon the radial distance r and the azimuthal angle θ. The second term of [Equation 8] provides a bend-induced correction term.

As illustrated in FIG. 6, θ=0 corresponds to the outer edge 16 of the bend illustrated in FIG. 3 (now straightened as illustrated in FIG. 5), where the equivalent refractive index of the bent fiber $n_b$ is the largest (see [Equation 8]). As also illustrated in FIG. 6, θ=π corresponds to the inner edge 18 of the bend illustrated in FIG. 3 (now straightened as illustrated in FIG. 5), where the equivalent refractive index $n_b$ is the smallest.

Modifying the H operator in [Equation 2] to include the bend-induced correction term of [Equation 8], we obtain a perturbed wave equation for the straightened fiber:

$$(H+\sigma\delta H)O_{l,m}'(r,\theta)=\beta_{l,m}'^{2}O_{l,m}'(r,\theta),\qquad\text{[Equation 9]}$$

where the bend perturbation parameter σ=α/R<<1 and $SH=(2k^2n^2r\cos\theta)/\alpha$; $\beta'_{l,m}$ and $O'_{l,m}$ are respectively the perturbed propagation constant and the perturbed amplitude of the $OAM_{l,m}$ mode. The $O'_{l,m}$'s, like the $O_{l,m}$'s, form a complete orthonormal set; they are the eigenfunctions of the perturbed Hermitian operator, H+σδH. Perturbation theory is used to solve Equation 8. The arguments r, θ are suppressed for convenience, unless required by the context. The solution of the perturbed wave equation for the straightened fiber leads to [Equation 7], where σ=α/R (<<1). The bend-induced transition matrix element, $\delta H_{(l',m')(l'',m'')}$, where l', l'', m', m'' assume arbitrary values, is a scalar (inner) product defined as $$\delta H_{(l',m')(l'',m'')} = \int_0^\infty\int_0^{2\pi} O^*_{l',m'}(\delta H)O_{l'',m''}rdrd\theta =\qquad\text{[Equation 10]}$$

$$\frac{2k^2}{a}\int_0^\infty\int_0^{2\pi} O^*_{l',m'}(n^2r\cos\theta)O_{l'',m''}rdrd\theta;$$

$O^*_{l',m'}$ is the complex conjugate of $O_{l',m'}$. Invoking the exponential azimuthal dependence of an OAM mode as illustrated for the step-index fiber in [Equation 3], we find $\delta H_{(l',m')(l'',m'')} \neq 0$ only for $\Delta l = l'-l'' = \pm 1$, a general selection rule that manifests itself in [Equation 7]. Note that $\delta H_{(l',m')(l'',m'')} = \delta H_{(l',m')(l'',m'')}$ and $\delta H_{(l',m')(l'',m'')} = \delta H_{(l',m')(l'',m'')}$.

Figure 7:
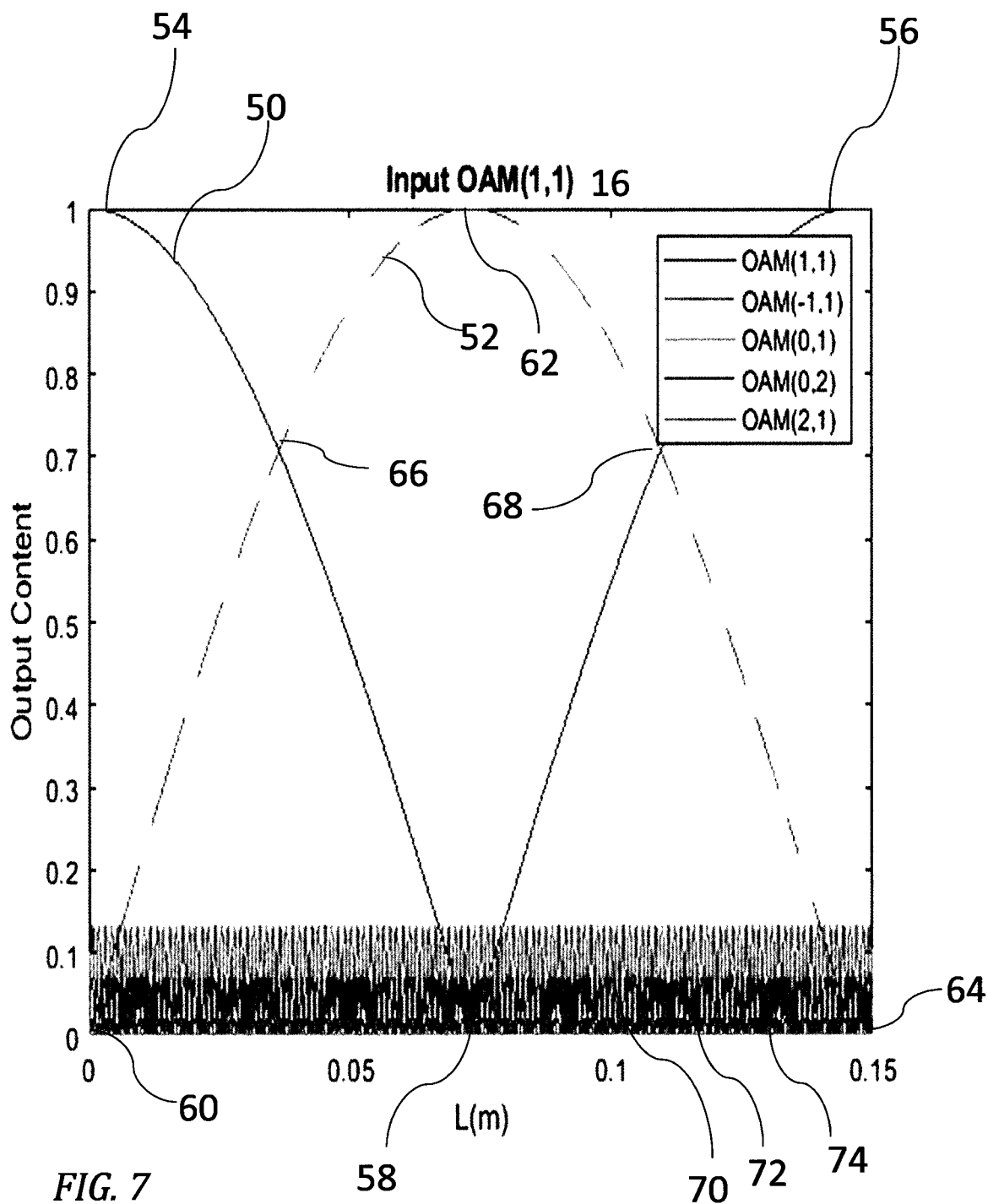
FIG. 7 illustrates OAM mode oscillations over a length of bent step-index fiber including oscillations of an input mode, the converted degenerate mode, and neighboring modes.

FIG. 7 provides an example plot 50 of the intensity of the applied (input) mode $OAM_{1,1}$ of a light signal applied to a bent fiber (indicated by a solid line) and a plot 52 of the intensity of the degenerate (converted) mode $OAM_{-1,1}$ (indicated by a dashed line). The input signal having mode $OAM_{1,1}$ is applied to a bent step-index fiber with a bend radius R of 4 cm, a core refractive index $n_1=1.45205$, a cladding refractive index $n_2=1.44681$, a core radius $a=10$ μm, and the wavelength of the light applied to the fiber $\lambda=1.55$ μm). More specifically, FIG. 7 illustrates the effect of the bend on the $OAM_{1,1}$ mode of light signal. As illustrated, the input mode 50 is at a maximum 54 in the straight fiber (i.e., before the bend occurs in the fiber, L=0). As the light travels along the length of the bend, the amplitude of the applied mode $OAM_{1,1}$ decreases to 0 at L≈0.075 m and then returns to its maximum 56 at the bend-induced $2\pi$ walk-off length $L_{1,1}^{b(2\pi)}$ (L≈0.15 m). The applied mode $OAM_{1,1}$ is at its minimum 58 at a length equal to ½ of the bend-induced $2\pi$ walk-off length. The amplitude of the converted mode $OAM_{-1,1}$ before bending of the fiber (i.e., L=0) 60, is zero. As the light travels along the length of the bend, the amplitude of the converted mode $OAM_{-1,1}$ (i.e. the degenerate mode) begins to be observed and increases until it reaches its maximum 62 at a length equal to ½ of the bend-induced $2\pi$ walk-off length (L≈0.075 m) and then returns to zero at the bend-induced $2\pi$ walk-off length 64 (approximately L≈0.15 m).

Each point along the bend of the fiber includes a mixture of the applied input mode $OAM_{1,1}$ and the converted degenerate mode $OAM_{-1,1}$. In general the mixture of the $OAM_{l,m}$ mode and its degenerate partner $OAM_{-l,m}$, within the bent fiber at length L is described by the amplitude:

$$\phi_{l,m}^{(b)}(L) = \left(\cos\left(\frac{\pi L}{L_{l,m}^{b(2\pi)}}\right)O_{l,m} + i\sin\left(\frac{\pi L}{L_{l,m}^{b(2\pi)}}\right)O_{-l,m}\right)e^{i\beta_{l,m}L}. \quad \text{[Equation 11]}$$

The amplitudes of the applied mode $OAM_{1,1}$ and the converted mode $OAM_{-1,1}$ are equal at ¼ of the bend-induced $2\pi$ walk-off length (66) and again at ¾ of the bend-induced $2\pi$ walk-off length (68). At ½ of the bend-induced $2\pi$ walk-off length, the applied mode of the light having a topological charge of 1 is converted to light having a topological charge of −1 (i.e.. the degenerate mode is at its maximum) (62).

Table 1 provides calculated bend-induced $2\pi$ walk-off lengths (in meters) for various $OAM_{l,m}$ modes. These calculations relate to an OFS-manufactured step index fiber having parameters: $\alpha=10$ μm, $n_1=1.45205$, $n_2=1.44681$. An input wavelength $\lambda=1.55$ μm implies a normalized frequency $V=2\pi\alpha\sqrt{(n_1^2-n_2^2)}/\lambda=4.996$. This normalized frequency implies that the fiber could support up to 6 modes: $OAM_{0,1}$, $OAM_{0,2}$ and the two degenerate pairs: $OAM_{1,1}$, $OAM_{-1,1}$, $OAM_{2,1}$, and $OAM_{-2,1}$.

TABLE 1

Bend-induced $2\pi$ walk-off lengths (in meters) for few mode fiber

| l, m | R = 4 cm | R = 8 cm |
|---|---|---|
| 1, 1 | 0.146 | 0.585 |
| 2, 1 | 416 | 6.65 × 10³ |

As illustrated by Table 1, as the radius of the bend increases, the bend-induced $2\pi$ walk-off length also increases. The bend-induced $2\pi$ walk-off length $L_{l,m}^{b(2\pi)}$ varies as $R^{2l}$ for fixed l, m. In practice, we want to keep the radius of the bend above a certain minimum threshold because for very small bend radii, stresses can build up and energy can also leak out through the cladding. This minimum threshold $R_{thr}$ is fiber dependent and is typically around 2 cm in commercial fibers.

Figure 8:
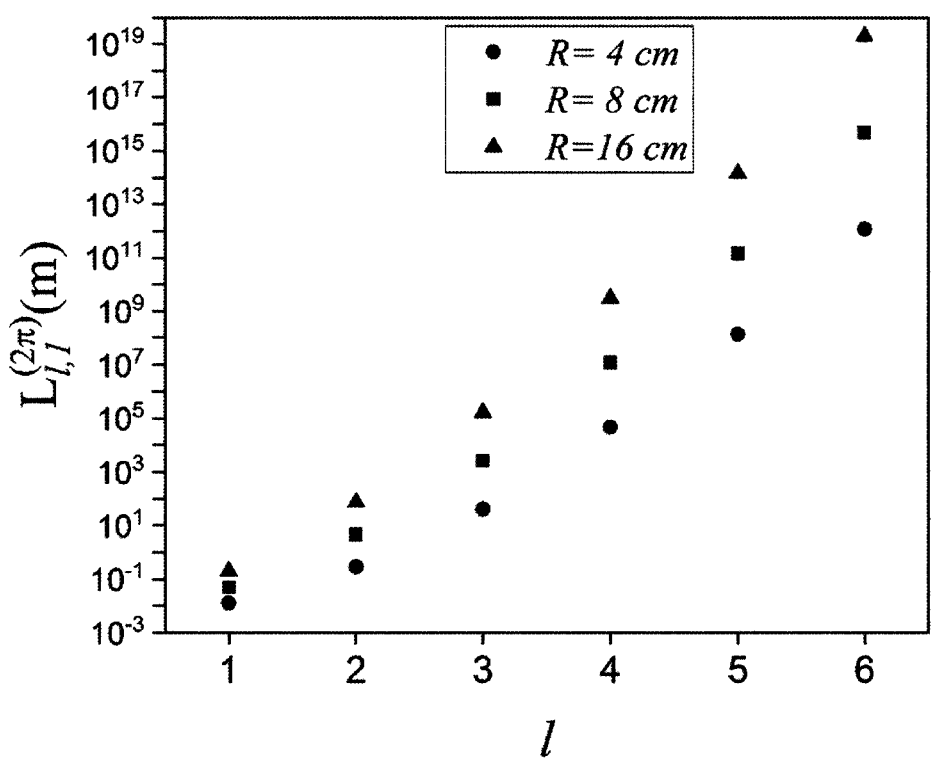
FIG. 8 illustrates plots of the $2\pi$ walk-off lengths for bent step-index optical fiber and wherein the impact of the radius of the fiber bend and the impact on the topological charge on the $2\pi$ walk-off lengths is illustrated.

In general a multimode fiber can accommodate more than the two OAM values (l=1, l=2) that we have considered in the few mode fiber. FIG. 8 illustrates bend-induced $2\pi$ walk-off lengths for a multimode fiber with the parameters: $n_1=1.461$, $n_2=1.444$, a=25 um, $\lambda=1.55$ μm, and radial index m=1. Similar to the few mode fiber (as illustrated in Table 1), the bend-induced $2\pi$ walk-off length for a multimode fiber varies depending upon the l value. As illustrated in FIG. 8, as l increases, the bend-induced $2\pi$ walk-off length also increases becoming almost exponential for large values of l due to the fact that the bend induced torque for a given radius R finds it harder to generate an OAM transfer of 2l in magnitude. As also illustrated in FIG. 8, for a given value of l and m the bend-induced $2\pi$ walk-off length increases as $R^{2l}$. FIG. 8 includes $2\pi$ walk-off length calculations for various radii (i.e., R=4 cm, R=8 cm, and R=16 cm). As the radius of the bend increases, the bend-induced $2\pi$ walk-off length for a given l increases.

Figure 9A:
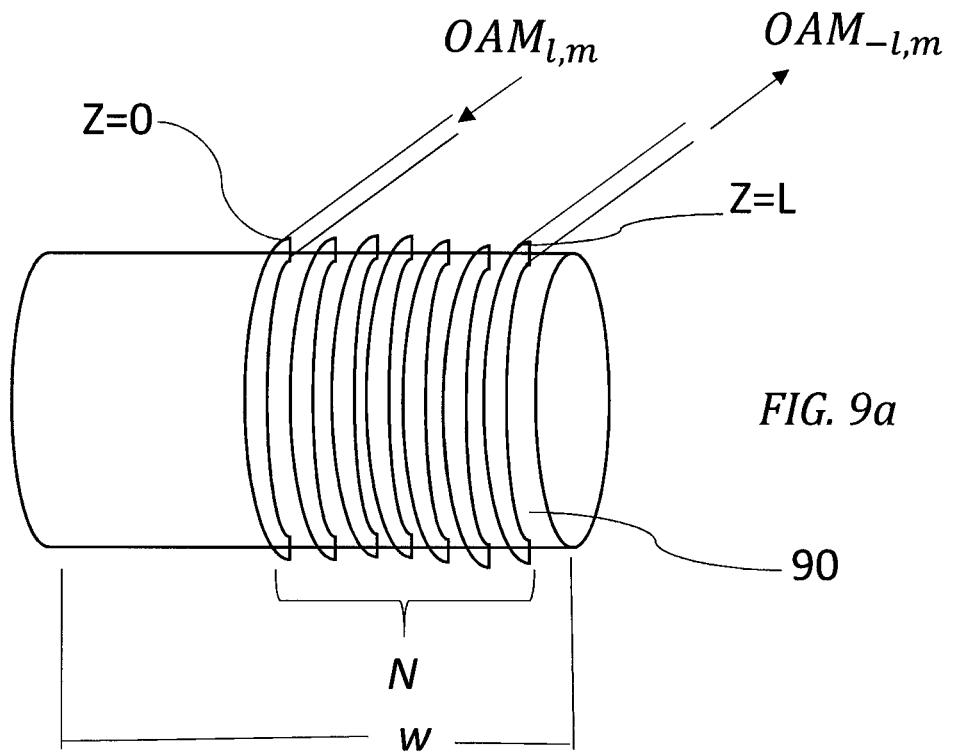
FIG. 9a illustrates a spool created with a bent fiber and having a plurality of windings.
Figure 9B:
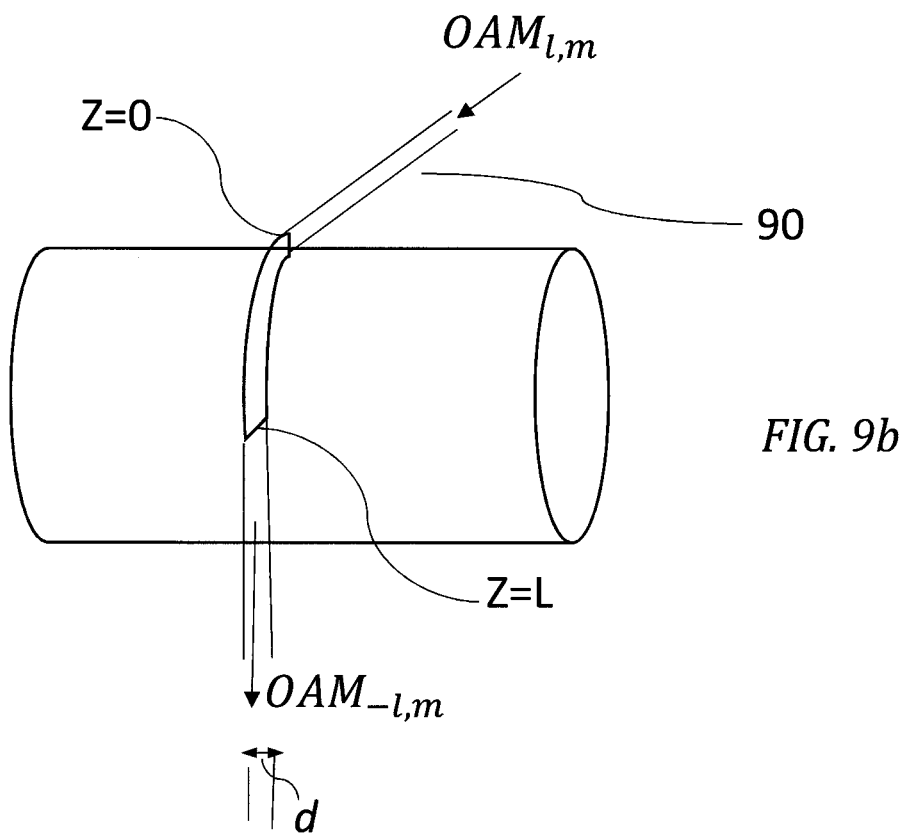
FIG. 9b illustrates a spool created with a bent fiber and having a partial winding.

As illustrated in FIGS. 4 and 7, at L=½ the bend-induced $2\pi$ walk-off length, the input mode of the light having a topological charge of 1 is completely converted to light having a topological charge of −1 (i.e. the degenerate mode). Thus, from the bend-induced $2\pi$ walk-off length $L_{l,m}^{b(2\pi)}$ we determine L, i.e the length L of the fiber from which a spool of bend radius R may be formed. Examples of mode converters used to generate the degenerate mode are illustrated in FIGS. 9a and 9b. The spool illustrated in FIG. 9a, includes a plurality of windings and the spool illustrated in FIG. 9b illustrates a partial winding. If the length L is insufficient to provide a complete winding and a spool having a partial winding is undesirable, as noted above, the length L may be increased by integral multiples of $L_{l,m}^{b(2\pi)}$ to achieve one full turn around the spool while providing for complete conversion of the topological charge from 1 to −1. As discussed in relation to FIG. 4, this complete conversion occurs in general at:

$$L = \frac{1}{2}L_{l,m}^{b(2\pi)}(n+1/2) \quad \text{[Equation 12]}$$

where n is an integer ≥0; i.e. the complete conversion occurs at $$\frac{1}{2}L_{l,m}^{b(2\pi)},$$

again at (1½) $L_{l,m}^{b(2\pi)}$, at (2½) $L_{l,m}^{b(2\pi)}$, etc. Although in FIG. 9a the windings have been spaced apart for purposes of illustration, it is to be understood that the windings may be formed adjacent to one another, i.e., in a manner which leaves no space between the windings.

Although the mode converter has been described as converting an applied input mode having a positive topological charge (i.e., l) to an output mode having a negative topological charge (i.e., −l), it is to be understood that if the topological charge of the input modes is negative, the mode converter will produce an output with a positive topological charge.

Along with the conversion of $OAM_{l,m}$ mode into its degenerate partner $OAM_{-l,m}$, a small fraction of the energy of the input mode is transformed into the neighboring partners of the input mode having a topological charge l±1 with a mixing coefficient (in the lowest perturbation order) given by:

$$a_{(l,m)(l\pm 1),n}^{(1)} = \sigma \frac{\delta H_{(l\pm 1,n)(l,m)}}{\left(\beta_{l,m}^2 - \beta_{l\pm 1,n}^2\right)}, \quad \text{[Equation 13]}$$

Accounting for the mixing with the neighboring modes, the output amplitude at the end of the bent fiber of length, L is modified and now given by:

$$\phi_{l,m}^{(b)}(L) = \left(\cos\left(\frac{\pi L}{L_{l,m}^{b(2\pi)}}\right)O_{l,m} + i\sin\left(\frac{\pi L}{L_{l,m}^{b(2\pi)}}\right)O_{-l,m}\right)e^{i\beta_{l,m}L} + \quad \text{[Equation 14]}$$

$$2i \sum_{l'=l\pm l,m'} a_{(l,m)(l',m')}^{(1)}\left(\cos\left(\frac{\pi L}{L_{l',m'}^{b(2\pi)}}\right)O_{l',m'} + i\sin\left(\frac{\pi L}{L_{l',m'}^{b(2\pi)}}\right)O_{-l',m'}\right)$$

$$\left(\frac{\sin(\beta_{l,m} - \beta_{l',m'})L}{2}\right)e^{i\frac{(\beta_{l,m}+\beta_{l',m'})L}{2}}$$

The term of [Equation 14] involving the summation is of order σ and constitutes an impurity of order σ² in its intensity (amplitude-squared) which is of order 1% or less of the input intensity. Due to the selection rule: Δl=±1, $OAM_{1,1}$ can mix with $OAM_{0,1}$, $OAM_{0,2}$, and $OAM_{2,1}$ in first order, and with $OAM_{-2,1}$ (indirectly) via the bend induced conversion of $OAM_{2,1}$ into its degenerate partner $OAM_{-2,1}$. In addition to the applied mode $OAM_{1,1}$ and the dominant converted mode $OAM_{-1,1}$, FIG. 7 also includes plots 70, 72, and 74 illustrating respectively admixed neighboring modes, $OAM_{0,1}$, $OAM_{2,1}$, and $OAM_{0,2}$. As illustrated in FIG. 7, throughout the transmission length of the bent fiber, modes $OAM_{0,1}$, $OAM_{2,1}$, and $OAM_{0,2}$ are minimally observed (i.e. the maximum amplitude of these modes remain below respectively 0.13, 0.06, 0.02). The amplitude of $OAM_{-2,1}$ is negligible and is not illustrated in FIG. 7.

In general, the individual content of the modes in the output amplitude mixture are expressed as crosstalk (in dB), defined as $$X_{(l,m)(l',m')}(L) = 10\log_{10}\left|<O_{l',m'}|\phi_{l,m}^{(b)}(L)>\right|^2 = \quad \text{[Equation 15]}$$

$$10\log_{10}\left|\int_0^\infty \int_0^{2\pi} O_{l',m'}\phi_{l,m}^{(b)}(L)r dr d\theta\right|^2$$

From Equation 15, we see that:

$$X_{(l,m)(l,m)} = 10\log_{10}\cos^2(\pi L/L_{l,m}^{b(2\pi)}); \text{ and}$$

$$X_{(l,m)(-l,m)} = 10\log_{10}\sin^2(\pi L/L_{l,m}^{b(2\pi)}).$$

Further, when l=l±1 (corresponding to neighboring modes), $$X_{(l,m)(l',m')} = \quad \text{[Equation 16]}$$

$$10\log_{10}\left(4\left|a_{(l,m)(l',m')}^{(1)}\right|^2\cos^2\left(\frac{\pi L}{L_{l',m'}^{b(2\pi)}}\right)\sin^2\left(\frac{(\beta_{l,m} - \beta_{l',m'})L}{2}\right)\right);$$

and when l'=(l±1) (corresponding to the degenerate partners of the neighboring modes), $$X_{(l,m)(l',m')} = \quad \text{[Equation 17]}$$

$$10\log_{10}\left(4\left|a_{(l,m)(l',m')}^{(1)}\right|^2\sin^2\left(\frac{\pi L}{L_{l',m'}^{b(2\pi)}}\right)\sin^2\left(\frac{(\beta_{l,m} - \beta_{l',m'})L}{2}\right)\right);$$

the minus signs in front of l' on the right-hand side of the equation negate the minus sign of l'. $X_{(l,m)(l',m')}$ is an explicit function of L, as we would expect. [Equation 16] and [Equation 17] imply a maximum possible crosstalk given essentially by $10 \log_{10}(4|\alpha_{(l,m)(l\pm 1,m')}^{(1)}|^2)$. This is due to the fact that $\sin(\beta_{l,m} - \beta_{l',m'})L/2)$ is a very rapidly varying function compared to the sinusoidal functions involving the 2π walk-off length because $\beta_{l,m} - \beta_{l',m'}$, the propagation constant difference between the two modes, is much greater than $(2\pi)/L_{l',m'}^{b(2\pi)}$.

As noted in Table 1, the 2π walk-off length for a few mode fiber having a bend radius of 4 cm is $L_{2,1}^{(2\pi)}$=416 m. Table 2 includes calculated crosstalk values for such a fiber using input mode $OAM_{2,1}$. Specifically, crosstalk $X_{(2,1)(l',m')}$ (in dB) for the various component $OAM_{l',m'}$ modes within the $OAM_{2,1}$ output mode mixture as a function of L is calculated and provided in Table 2.

TABLE 2

| Crosstalk (in dB) for a bent few mode fiber (R = 4 cm) | | | | | |
|---|---|---|---|---|---|
| l', m' | L = 2 m | L = 10 m | L = 100 m | L = 200 m | L = 400 m |
| 2, 1 | −.001 | −.025 | −2.71 | −24.4 | −.064 |
| −2, 1 | −36.4 | −22.4 | −3.33 | −.016 | −18.4 |
| 1, 1 | −33.5 | −48.9 | −37.1 | −28.0 | −43.4 |
| −1, 1 | −30.0 | −35.0 | −30.1 | −27.0 | −24.2 |

While the crosstalk of the primary mode $OAM_{2,1}$ and its degenerate partner $OAM_{-2,1}$ increases or decreases with L due to the oscillatory transformations into each other (see FIG. 4), the crosstalk for the admixed neighboring amplitudes, $OAM_{1,1}$ and $OAM_{-1,1}$ remains below their upper bound of $10 \log_{10}(4|\alpha_{(2,1)(1,1)}^{(1)}|_2)$=−23 dB.

Table 3 includes calculated crosstalk values for the multimode step-index fiber using input mode $OAM_{4,1}$ and R=4 cm. Specifically, crosstalk $X_{(4,1)(l',m')}$ (in dB) for the various component $OAM_{l',m'}$ modes within the $OAM_{4,1}$ output mode mixture as a function of L is calculated and provided in Table 3. $OAM_{4,1}$ mode mixes with its neighboring modes, l=3 and l=5; this mixing also give rise to the mixing with l=−3 and l=−5 due to the conversion of l=3 and l=5 into its degenerate partners on account of the bend. Here the admixed modes l=3 and l=5 (and their degenerate partners) are bounded from above by −10.8 dB and −13.6 dB, which is somewhat higher compared to the few mode fiber case.

TABLE 3

Cross talk (in dB) for a bent multimode fiber (R = 4 cm)

| l', m' | L = 100 m | L = 1 km | L = 10 km |
|---|---|---|---|
| 4, 1 | 0 | −0.02 | −2.2 |
| −4, 1 | −43.4 | −23.4 | −4.1 |
| 3, 1 | −27.2 | −41.0 | −15.4 |
| −3, 1 | −11.0 | −10.8 | −25.3 |
| 5, 1 | −14.1 | −24.8 | −22.7 |
| −5, 1 | −127.1 | −117.7 | −95.7 |

A maximum crosstalk possible with the neighboring modes, which is determined by the parameter $\alpha_{(l,m)(l\pm 1),n}^{(1)}$ (see [Equation 13]), can be reduced by an appropriate choice of the fiber parameters, wherein the propagation constant differences (provided in the denominator in [Equation 13]) can be increased. A great body of knowledge of the propagation characteristics and their dependence on fiber parameters exists within the world literature on a multimode fiber. In a practical setting, the undesirable admixed modes can also be removed using a device called a mode sorter, for example.

In addition to providing conversion of the mode by bending the fiber, the mode may be converted using the ellipticity of the fiber. i.e., fiber ellipticity also gives rise to the transformation of the input OAM mode into its degenerate partner. We model a straight, slightly elliptical fiber (see FIG. 3) as a perfectly round fiber with a modified refractive index given by $$n_e^2(r,\theta) = n^2(r) - 2\epsilon \Delta n_1^2 (\partial f(r)/\partial r) r \cos(2\theta); \qquad \text{[Equation 18]}$$

Ellipticity $\epsilon$ (<<1) is defined as the ratio of the difference of the semi-major axis and the semi-minor axis to their sum, and equals $e^2/4$, where e is the eccentricity of the ellipse. This relationship is well established; see for example, C. N. Alexeyev, et al, *Spin-orbit interaction in a generic vortex field transmitted through an elliptic fiber*, Semiconductor Phys Quantum Electron & Optoelectron, 3, p. 501-513 (2000). Replacing n with $n_e$ in [Equation 3], the perturbed scalar wave equation similar in form to [Equation 8] is:

$$(H+\epsilon \delta H) O'_{l,m}(r,\theta) = \beta'^2_{l,m} O'_{l,m}(r,\theta), \qquad \text{[Equation 19]}$$

where $O'_{l,m}(r, \theta)$ and $\beta'_{l,m}$ are the corresponding ellipticity-perturbed mode amplitude and propagation constant, respectively, and $$\delta H = 2k^2 n_1^2 \Delta \cos 2\theta (\partial f(r)/\partial r) r. \qquad \text{[Equation 20]}$$

The effect of the perturbation $\epsilon \delta H$ is to cause mixing of an input OAM mode, $OAM_{l,m}$ with other (orthogonal) fiber OAM modes characterized by different pairs of parameters, (l', m')≠(l, m), as described below. The ellipticity induced transition matrix element is defined as $$\delta H_{(l',m')(l'',m'')} = < O_{l',m'} \left| \delta H \right|$$

$$O_{l'',m''} >= \int_0^\infty \int_0^{2\pi} O^*_{l',m'} (\delta H) O_{l'',m''} r dr d\theta =$$

$$-2k^2 n_1^2 \Delta \int_0^\infty \int_0^{2\pi} O^*_{l',m'} \left(\frac{\partial f(r)}{\partial r}\right) \cos(2\theta) O_{l'',m''} r^2 dr d\theta; \qquad \text{[Equation 21]}$$

$\delta H_{(l',m')(l'',m'')}$ is not equal to 0 only if $\Delta l = l' - l'' = \pm 2$. Note that $\delta H_{(-l',m')(-l'',m'')} = \delta H_{(l',m')(l'',m'')}$ and $\delta H_{(l'',m'')(l',m')} = \delta H_{(l',m')(l'',m'')}$.

The complete procedure for determining an ellipticity-induced 2π walk-off length is given in the inventor's paper titled *Orbital-Angular-Momentum (OAM) mode mixing in slightly elliptical fibers in perturbation theory*, Proceedings of the Frontiers in Optics, Optical Society of America, September 2019, Paper JTu4A.56. The solution is $$L_{l,m}^{e(2\pi)} = \frac{2\pi}{\Delta \beta'_{l,m}} \approx \frac{2\pi \beta_{l,m}}{\gamma_{l,m}}, \qquad \text{[Equation 22]}$$

where superscript e is used to denote an ellipticity-induced a 2π walk-off length and differentiates an ellipticity-induced 2π walk-off length $L_{l,m}^{e(2\pi)}$ from the bend-induced 2π walk-off length $L_{l,m}^{b(2\pi)}$ and $\gamma_{l,m}$, is given by:

[Equation 23]

$$\gamma_{l,m} =$$

$$(\epsilon)^l \sum \frac{\delta H_{(l,m)(l-2,n)} \delta H_{(l-2,n)(l-4,p)} \cdots \delta H_{(-l+4,q)(-l+2,j)} \delta H_{(-l+2,j)(-l,m)}}{(\beta^2_{l,m} - \beta^2_{l-2,n})(\beta^2_{l,m} - \beta^2_{l-4,p}) \cdots (\beta^2_{l,m} - \beta^2_{-l+4,q})(\beta^2_{l,m} - \beta^2_{-l+2,j})} (l > 1);$$

$$\gamma_{l,m} = \epsilon \delta H_{(l,m)(-l,m)} (l = 1).$$

The summation Σ on the right-hand-side indicates summation over the repeated indices, such as n, p, q and j, signifying inclusion of all radial mode solutions for all considered topological charges in the above summation, except for l and −l, where radial index m is fixed. From [Equation 22] and [Equation 23], we see that $L_{l,m}^{e(2\pi)}$ is proportional to $\epsilon^{-l}$, for the same l and m, implying that as the elliptical fiber approaches perfect roundness, meaning $\epsilon = 0$, the ellipticity-induced a 2π walk-off length approaches infinity. Table 4 provides sample calculations of the ellipticity-induced 2π walk-off length, $L_{l,m}^{e(2\pi)}$, specified in meters, as a function of ellipticity e for different input modes, $OAM_{l,m}$ and normalized frequency V=4.996. The ellipticity-induced 2π walk-off length, $L_{l,m}^{(2\pi)}$, varies as $\epsilon^{-l}$ for fixed l, m (see [Equation 22] and [Equation 23]).

TABLE 4

Ellipticity-induced 2π walk-off lengths (in meters)

| l, m | $\epsilon = 0.005$ | $\epsilon = 0.010$ | $\epsilon = 0.015$ | $\epsilon = 0.025$ | $\epsilon = 0.040$ |
|---|---|---|---|---|---|
| 1, 1 | 0.372 | 0.186 | 0.124 | 0.074 | 0.047 |
| 2, 1 | 29.18 | 7.30 | 3.24 | 1.17 | 0.456 |

As illustrated in Table 4 the larger the ellipticity E, the smaller the ellipticity-induced 2π walk-off length $L_{l,m}^{e(2\pi)}$ due to the $\epsilon^{-1}$ dependence. Because the ellipticity-induced torque increases with ellipticity, the distance over which the OAM changes from +1 to −1 is shortened as ellipticity increases. This relationship between ellipticity and the ellipticity-induced 2π walk-off length $L_{l,m}^{e(2\pi)}$ for various modes l is illustrated in FIG. 10.

Figure 10:
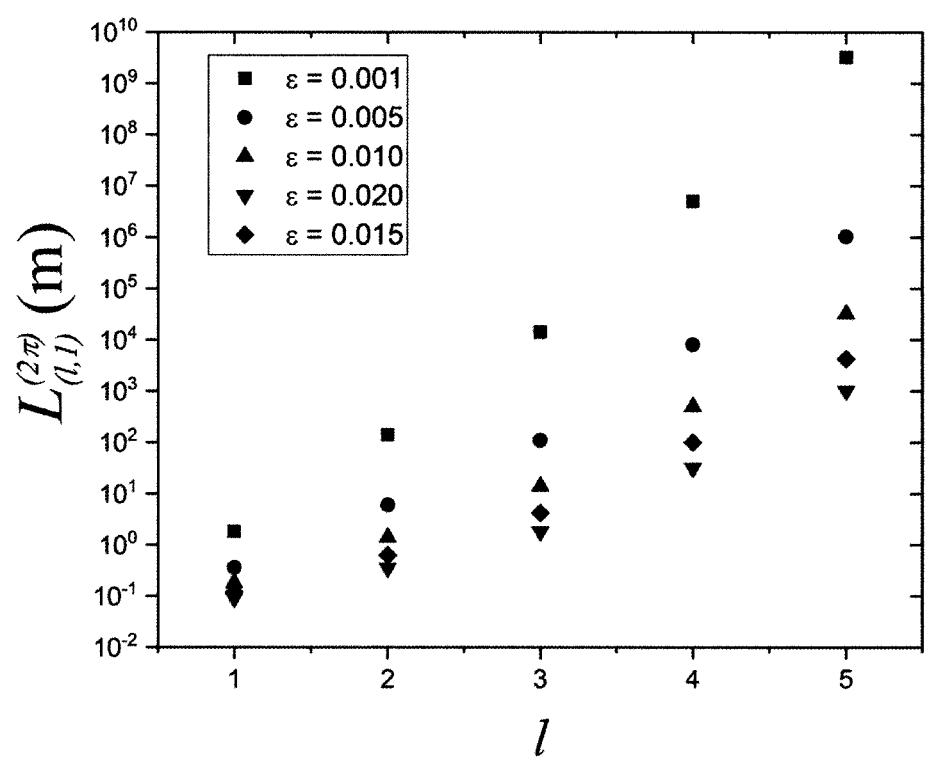
FIG. 10 illustrates plots of the $2\pi$ walk-off lengths for an elliptically-shaped step-index optical fiber wherein the impact of the ellipticity and the impact of the topological charge on the $2\pi$ walk-off lengths is illustrated.

As also illustrated in FIG. 10, the ellipticity-induced 2π walk-off length $L_{l,m}^{e(2\pi)}$ as a function of topological charge l is seen to increase dramatically with rising values of l, indicating the increasing difficultly of ellipticity-induced torque to engender an orbital angular momentum transfer of 2l in magnitude as l increases.

Similar to the bend case illustrated in FIG. 4, the input $OAM_{l,m}$ mode changes into its degenerate partner $OAM_{-l,m}$ as the length L of the elliptical fiber changes. This conversion to the degenerate mode is also accompanied by a slight conversion into the neighboring mode $OAM_{l\pm 2,m}$.

$$a^{(1)}_{(l,m)(l\pm 2,n)} = \frac{\epsilon \delta H_{(l\pm 2,n)(l,m)}}{\left(\beta^2_{l,m} - \beta^2_{l\pm 2,n}\right)} \quad \text{[Equation 24]}$$

At length L the amplitude of the output is given by:

$$\psi^{(e)}_{l,m}(L) = \left(\cos\left(\pi L / L^{e(2\pi)}_{l,m}\right)O_{l,m} + i\sin\left(\pi L / L^{e(2\pi)}_{l,m}\right)O_{-l,m}\right)e^{i\beta_{l,m}L} +$$
$$2i \sum_{l'=l\pm 2,m'} a^{(1)}_{(l,m)(l',m')}\left(\cos\left(\pi L / L^{e(2\pi)}_{l',m'}\right)O_{l',m'} +\right.$$
$$\left. i\sin\left(\pi L / L^{e(2\pi)}_{l',m'}\right)|O_{-l',m'}\right)\left(\sin(\beta_{l,m}-\beta_{l',m'})L/2\right)e^{i(\beta_{l,m}+\beta_{l',m'})L/2}. \quad \text{[Equation 25]}$$

The term involving the summation is of order $\in$ and constitutes an impurity of order $\in^2$ in its intensity (amplitude-squared) which for example, for ç=0.01, equals 0.0001, which is negligibly small. The presence of impurities can also be computed using the entity called crosstalk defined as:

$$\chi_{(l,m)(n,k)}(L) = 10\log_{10}\left|<O_{n,k}\left|\psi^{(e)}_{l,m}(L)>\right|^2 = \quad \text{[Equation 26]}$$
$$10\log_{10}\left|\int_0^\infty \int_0^{2\pi} O^*_{n,k}\psi^{(e)}_{l,m}(L)rdrd\theta\right|^2.$$

Crosstalk is the quantitative measure of the individual modes within the mixture in decibels (dB). Crosstalk for the degenerate mode is given by:

$$\chi_{(l,m)(-l,m)}(L) = 10\log_{10}\sin^2(\pi L/L_{l,m}^{e(2\pi)}). \quad \text{[Equation 27]}$$

Crosstalk for the original input mode is given by:

$$\chi_{(l,m)(l,m)}(L) = 10\log_{10}\cos^2(\pi L/L_{l,m}^{e(2\pi)}). \quad \text{[Equation 28]}$$

Crosstalk for the neighboring modes is given by:

$$\chi_{(l,m)(l',m')} = 10\log_{10}(4|\alpha_{(l,m)(l',m')}^{(1)}|^2 \cos^2(\pi L/L_{l',m'}^{e(2\pi)})\sin^2((\beta_{l,m}-\beta_{l',m'})L/2)), \quad \text{[Equation 29]}$$

Crosstalk for the degenerate partners of the neighboring modes is given by:

$$\chi_{(l,m)(l',m')} = 10\log_{10}(4|\alpha_{(l,m)(l',m')}^{(1)}|^2 \sin^2(\pi L/L_{l',m'}^{e(2\pi)})\sin^2((\beta_{l,m}-\beta_{l',m'})L/2)), \quad \text{[Equation 30]}$$

A maximum possible crosstalk after setting the sinusoidal functions equal to unity is provided by:

$$\chi_{(l,m)(l',m')}^{(max)} = 10\log_{10}(4|\alpha_{(l,m)(l',m')}^{(1)}|^2); \quad \text{[Equation 31]}$$

Table 5 includes calculated crosstalk values for a few-mode fiber using input mode $OAM_{2,1}$, $\in=0.01$, and normalized frequency V=4.996. As noted in Table 4, the ellipticity-induced $2\pi$ walk-off length $L_{2,1}^{e(2\pi)}$ for such a fiber is 7.30 m. Specifically, crosstalk $X_{(2,1)(l',m')}$ (in dB) for the various component $OAM_{l',m'}$ modes within the $OAM_{2,1}$ output mode mixture $\psi_{2,1}^{(e)}$ as a function of L is calculated and provided in Table 5. $OAM_{2,1}$ mode mixes with its neighboring mode l=0, m=1 and neighboring mode l=0, m=2; this mixing also gives rise to the mixing with l=2, m=1 and its degenerate partner l=−2, m=1 on account of the ellipticity.

TABLE 5

Cross talk values for an elliptical few-mode fiber ($\epsilon = 0.01$)

| l', m' | L = 1.0 m | L = 2.0 m | L = 4.0 m | L = 8 m | L = 10 m |
|---|---|---|---|---|---|
| 2, 1 | −0.08 | −3.72 | −16.48 | −0.40 | −8.01 |
| −2, 1 | −7.59 | −2.40 | −0.10 | −10.55 | −0.75 |

TABLE 5-continued

Cross talk values for an elliptical few-mode fiber ($\epsilon = 0.01$)

| l', m' | L = 1.0 m | L = 2.0 m | L = 4.0 m | L = 8 m | L = 10 m |
|---|---|---|---|---|---|
| 0, 1 | −52.18 | −79.08 | −73.07 | −67.08 | −65.17 |
| 0, 2 | −33.03 | −30.12 | −57.14 | −51.13 | −30.17 |

From Table 5, we can see that the cross-talk values for the neighboring modes $OAM_{0,1}$ and $OAM_{0,2}$ lie below the maximum value of $10 \log_{10}(4|\alpha_{(l,m)(l',m')}^{(1)}|^2)$ equal to −46.16 dB for the $OAM_{0,1}$ mode, and equal to −24.10 dB for the $OAM_{0,2}$ mode.

Table 6 includes calculated crosstalk values for multi-mode fiber using l=3, m=1, i.e., input mode $OAM_{3,1}$, $\in=0.015$. The ellipticity-induced $2\pi$ walk-off length $L_{3,1}^{e(2\pi)}$ for such a fiber is 4.15 m. Specifically, crosstalk $X_{(3,1)(l',m')}$ (in dB) for the various component $OAM_{l',m'}$ modes within the $OAM_{3,1}$ output mode mixture $\psi_{3,1}^{(e)}$ as a function of L is calculated and provided in Table 6 only for the most dominant admixed neighboring modes. For example the most dominant neighboring modes for $OAM_{3,1}$ are $OAM_{1,2}$ and $OAM_{-1,2}$. This mixing also gives rise to the mixing with l=3, m=1 and its degenerate partner l=−3, m=1 on account of the ellipticity. Table 6 also includes calculated crosstalk values for a multimode fiber using l=2, m=1; i.e., input mode $OAM_{2,1}$, $\in=0.015$. The ellipticity-induced $2\pi$ walk-off length $L_{2,1}$ for such a fiber is 0.63 m. Specifically, crosstalk $X_{(2,1)(l',m')}$ (in dB) for the various component $OAM_{l',m'}$ modes within the $OAM_{2,1}$ output mode mixture $\psi_{2,1}^{(e)}$ as a function of L is calculated and provided in Table 6. $OAM_{2,1}$ mode mixes with its neighboring mode $OAM_{0,2}$. This mixing also gives rise to the mixing with l=2, m=1 and its degenerate partner l=−2, m=1 on account of the ellipticity.

TABLE 6

Crosstalk (in dB) for an elliptical multimode fiber ($\epsilon = 0.015$)

| l', m' | L = 0.5 m | L = 1.0 m | L = 2.0 m | L = 4.0 m | L = 5.0 |
|---|---|---|---|---|---|
| 3, 1 | −0.64 | −2.77 | −24.92 | −0.06 | −1.94 |
| −3, 1 | −8.65 | −3.26 | −0.01 | −18.19 | −4.44 |
| 1, 2 | −20.59 | −23.07 | −19.11 | −34.04 | −18.65 |
| −1, 2 | −16.18 | −17.55 | −15.75 | −25.99 | −17.28 |
| 2, 1 | −1.97 | −11.35 | −1.38 | −6.82 | −0.17 |
| −2, 1 | −4.38 | −0.33 | −5.66 | −1.01 | −14.06 |
| 0, 2 | −17.86 | −16.69 | −19.92 | −16.26 | −30.70 |

As described above, the bend-induced $2\pi$ walk-off length $L_{l,m}^{b(2\pi)} \propto R^{2l}$ and ellipticity-induced $2\pi$ walk-off length $L_{l,m}{}^{e(2\pi)} \propto \varepsilon^{-l}$. If the fiber from which the mode converter is to be formed has elliptical characteristics, the length of fiber from which the spool is to be formed is adjusted to account for the ellipticity-induced $2\pi$ walk-off length $L_{l,m}{}^{e(2\pi)}$. The specific manner in which the bend-induced $2\pi$ walk-off length $L_{l,m}{}^{e(2\pi)}$ is adjusted to account for the ellipticity-induced $2\pi$ walk-off length Lis described below as part of the process for forming a mode converter.

Figure 11A:
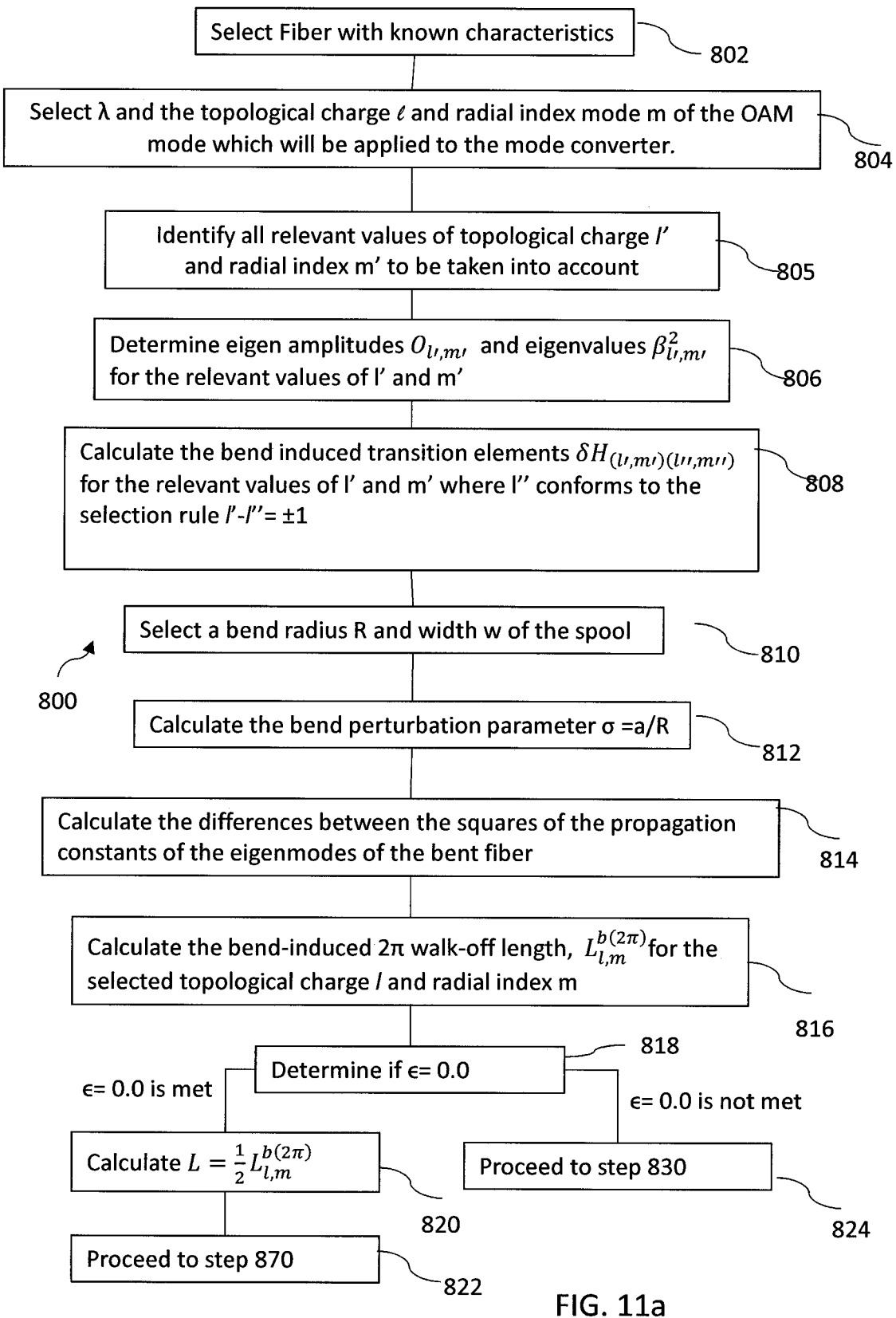
FIGS. 11a-11c illustrate a method of forming a mode converter.
Figure 11B:
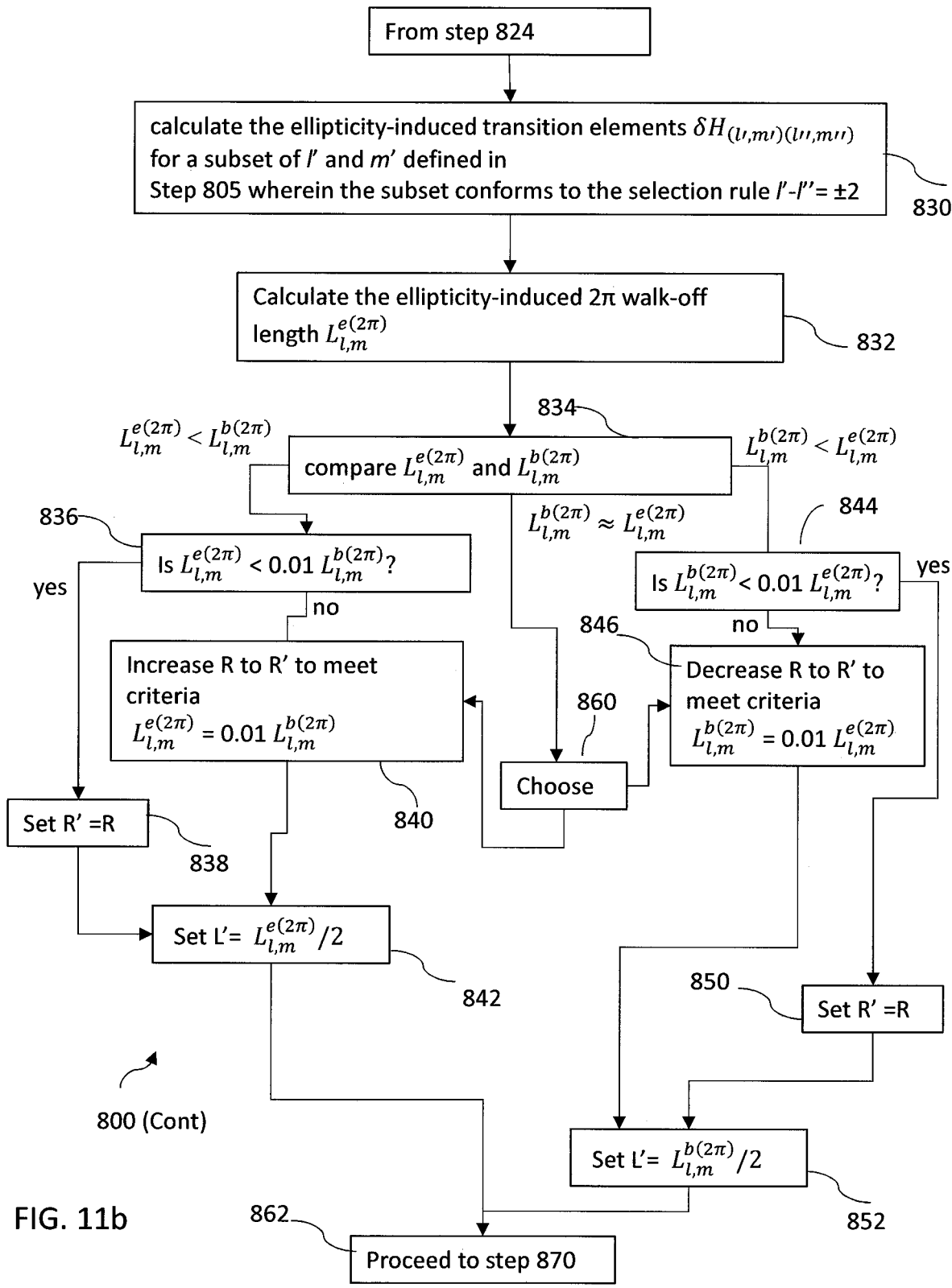
Figure 11C:
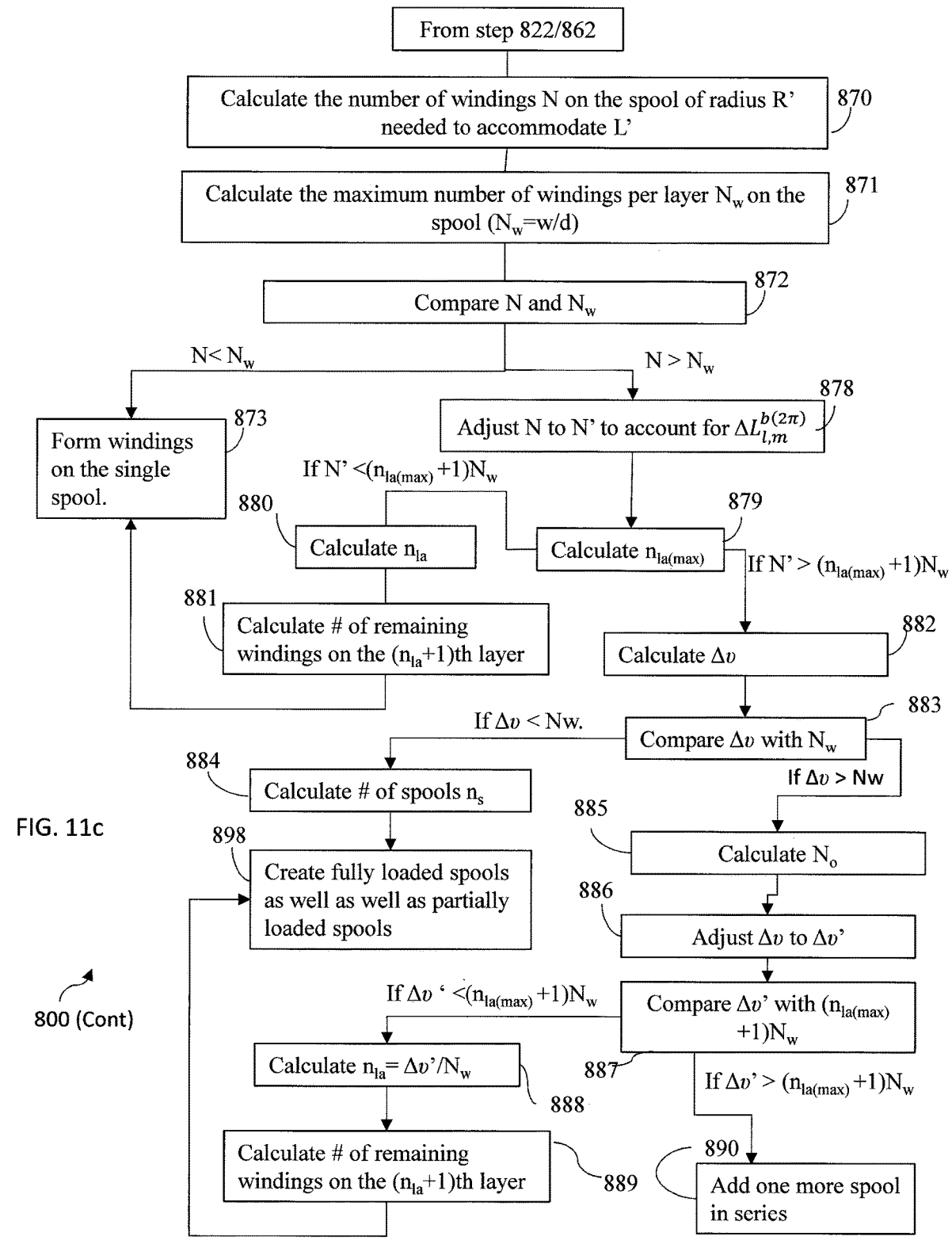

A process 800 of creating an OAM mode converter is illustrated in FIGS. 11a-c. The process begins at step 802 by selecting a fiber having known characteristics including a core refractive index $n_1$, a cladding refractive index $n_2$, index profile function f(r), a core radius a, a diameter of fiber (cladding+protection layer) d, and a core ellipticity E.

Next, at step 804 select X of the light and the topological charge l and radial index mode m of the OAM mode of the light which will be applied to the mode converter.

At step 805, identify all relevant values of l' and m' of the OAM modes to be taken into account for the bent fiber. Specifically, the values of l' range from l to −l, decrementing in steps of unity. For l'=l and l'=−l, m'=m. For each l'≠∓l, m' ranges from 1 to highest allowed m'. The highest value of m' associated with a specific topological charge l' is dependent upon the fiber parameters, and determined from the standard scalar wave equation [Equation 2].

Next at step 806, from the standard scalar wave equation [Equation 2], determine the eigenamplitudes $O_{l',m'}$ and eigenvalues $\beta_{l',m'}^2$ for all relevant values of l' and m' identified at step 805.

At step 808, using the eigenamplitudes $O_{l',m'}$ calculated in step 806, the bend induced transition elements $\delta H_{(l',m')(l'',m'')}$ are calculated in accordance with [Equation 10] for a subset of all relevant values l' and m' identified in step 805 above, where l''=l'−1, and m'' includes all values from 1 to the highest allowed value associated with $OAM_{(l'-l,m'')}$.

At step 810, the bend radius R of the fiber and width w of the spool are selected.

At step 812, calculate the bend perturbation parameter $\sigma = \alpha/R$

At step 814, the difference $\Delta \beta'_{l,m}{}^2$ between the squares of the propagation constants $\beta'_{l,m}{}^+$ and $\beta'_{l,m}{}^-$ of the eigenmodes of the bent fiber are calculated using [Equation 6] and [Equation 7]; the induced transition elements calculated at step 808, the eigenvalues calculated at step 806, and the value $\sigma=a/R$ calculated at step 812.

At step 816 using [Equation 5] and [Equation 6], calculate the bend-induced $2\pi$ walk-off length $$L_{l,m}^{b(2\pi)} = \frac{4\pi \beta_{l,m}}{\Delta \beta'^2_{l,m}},$$

for the selected topological charge l and radial index m.

At step 818, determine whether $\varepsilon = 0.0$.

If at step 818 it is determined that $\varepsilon = 0.0$, at step 820 the length of bent fiber L used to form the spool is calculated and at step 822, the process proceeds to step 870.

If at step 818 it is determined that c=0.0 is not satisfied, at step 824 process proceeds to step 830.

At step 830 using the eigenamplitudes $O_{l',m'}$ determined in step 806, calculate the ellipticity-induced transition elements $\delta H_{(l',m')(l'',m'')}$ in accordance with [Equation 21] for a subset of the l' and m' defined in step 805 (i.e., wherein the subset conforms to the selection rule l'−l''=±2).

At step 832, calculate the ellipticity-induced $2\pi$ walk-off length $L_{l,m}{}^{e(2\pi)}$ in accordance with [Equation 22] and [Equation 23].

At step 834, compare the ellipticity-induced $2\pi$ walk-off length $L_{l,m}{}^{e(2\pi)}$ and the bend-induced $2\pi$ walk-off length $L_{l,m}{}^{b(2\pi)}$ to determine which condition applies ($L_{l,m}{}^{3(2\pi)} < L_{l,m}{}^{b(2\pi)}$; $L_{l,m}{}^{b(2\pi)} < L_{l,m}{}^{3(2\pi)}$; or $L_{l,m}{}^{b(2\pi)} \approx L_{l,m}{}^{3(2\pi)}$)

When at step 834 it is determined $L_{l,m}{}^{e(2\pi)} < L_{l,m}{}^{b(2\pi)}$, at step 836 it is determined if $L_{l,m}{}^{e(2\pi)} < 0.01 L_{l,m}{}^{b(2\pi)}$. If at step 836 it is determined that $L_{l,m}{}^{e(2\pi)} < 0.01 L_{l,m}{}^{b(2\pi)}$, the process proceeds to step 838 where the radius of the bend R' is set to R (i.e., no adjustment to the bend radius is to be made), and the process proceeds to step 842. It is understood here that the fraction 0.01 appearing here and below is approximate.

If at step 836 it is determined that the condition $L_{l,m}{}^{e(2\pi)} < 0.01 L_{l,m}{}^{b(2\pi)}$ is not met, the process proceeds to step 840 where the radius of the bend R' is adjusted to meet the condition $L_{l,m}{}^{e(2\pi)} = 0.01 L_{l,m}{}^{b(2\pi)}$. After step 840 the process proceeds to step 842.

At step 842 the final length of the fiber L' is set equal to $$\frac{L_{l,m}^{e(2\pi)}}{2}.$$

An example where the condition $L_{l,m}{}^{e(2\pi)} < L_{l,m}{}^{b(2\pi)}$ is as follows. For the few-mode fiber, for l=2 and $\varepsilon = 0.01$, $L_{l,m}{}^{e(2\pi)} = 7.3$m and for a loop of radius R=4 cm, $L_{l,m}{}^{b(2\pi)} = 416$m. The criteria $L_{l,m}{}^{e(2\pi)} < 0.01 L_{l,m}{}^{b(2\pi)}$ is not met (i.e. 7.3 m is not less than 0.01(416 m)). Because the criteria is not met the bend radius R is adjusted to R'. Having already calculated $L_{l,m}{}^{b(2\pi)}$, the proportionality rule $L_{l,m}{}^{b(2\pi)} \propto R^{2l}$ can be used to find R'. Specifically, $$R' = R\left(L_{l,m}^{e(2\pi)} / (0.01 L_{l,m}^{b(2\pi)})\right)^{1/2l} = 4\,\text{cm}(730/416)^{\frac{1}{4}} = 4.60\,\text{cm}.$$

The final length of the fiber $$L' = \frac{L_{l,m}^{e(2\pi)}}{2} = 3.65\,\text{m}.$$

As noted above, the proportionality rule $L_{l,m}{}^{b(2\pi)} \propto R^{2l}$ allows for the calculation of R' without having to repeat steps 810-816 a number of times, each time starting with a new value of radius R in step 810, until a value of R=R' matching $$\frac{L_{l,m}^{e(2\pi)}}{0.01}$$

is found in Step 816, thereby reducing the time needed to perform the required calculations.

It is noted that typically $L_{l,m}{}^{b(2\pi)} < L_{l,m}{}^{e(2\pi)}$ when ellipticity is low (i.e., when the fiber is nearly round). When at step 834 it is determined $L_{l,m}{}^{b(2\pi)} < L_{l,m}{}^{e(2\pi)}$, at step 844 it is determined if $L_{l,m}{}^{b(2\pi)} < 0.01 L_{l,m}{}^{e(2\pi)}$. If at step 844 it is determined that $L_{l,m}{}^{b(2\pi)} < 0.01 L_{l,m}{}^{e(2\pi)}$ is not met, the process proceeds to step 846 where the bend radius R' is adjusted to meet the criteria $L_{l,m}{}^{b(2\pi)} = 0.01 L_{l,m}{}^{e(2\pi)}$. After step 846 the process proceeds to step 852.

If at step 844 it is determined that $L_{l,m}^{b(2\pi)} < 0.01\, L_{l,m}^{e(2\pi)}$, the process proceeds to step 850 where the bend radius R' is set to R (i.e., no adjustment to the bend radius is made) and the process proceeds to step 852.

At step 852 the length L' the final length of the fiber L' is set equal to $$\frac{L_{l,m}^{b(2\pi)}}{2}.$$

An example where the condition $L_{l,m}^{b(2\pi)} < L_{l,m}^{e(2\pi)}$ is as follows. For example, for the multimode fiber (see FIG. 8), $L_{l,m}^{b(2\pi)}=20$ m for l=3 and R=4 cm. Referring to FIG. 10, the fiber is characterized by an ellipticity-induced walk-off length, $L_{l,m}^{e(2\pi)}=112.05$ m for $\epsilon=0.005$. Using the ellipticity proportionality rule: $L_{l,m}^{e(2\pi)} \propto \epsilon^{-l}$ for ellipticity $\epsilon=0.003$, the fiber is characterized by an ellipticity-induced walk-off length. $L_{l,m}^{e(2\pi)}=112.05\,(0.005/0.003)^3=518.75$m. Note that the above proportionality rule for ellipticity circumvents the need to repeat the calculation of $L_{l,m}^{e(2\pi)}$. using step 806, step 830. and step 832. Although $L_{l,m}^{b(2\pi)}=20$ m is much less than $L_{l,m}^{e(2\pi)}=518.75$ m. the criteria $L_{l,m}^{b(2\pi)} < 0.01\, L_{l,m}^{e(2\pi)}$ has not been met. In order to meet the criteria $L_{l,m}^{b(2\pi)} < 0.01 L_{l,m}^{e(2\pi)}$, we modify the bend radius R of the spool. Specifically, using the proportionality rule $L_{l,m}^{b(2\pi)} \propto R^{2l}$. we calculate a reduced radius $R'=R(0.01 \times L_{l,m}^{e(2\pi)}/L_{l,m}^{b(2\pi)})^{1/2l}$ cm=$4(0.01 \times 518.75/20)^{1/6}$ cm=3.2 cm. It is noted that any radius reduction should not violate the minimum bend radius threshold. The final length of the fiber L'=$0.01\, L_{l,m}^{e(2\pi)}/2$=1.12m/2=0.56 m.

When at step 834 it is determined $L_{l,m}^{b(2\pi)} \approx L_{l,m}^{e(2\pi)}$ the process proceeds to step 860, where either process step 840 or process step 846 can be selected as the next step of the process. If it is desired that the bend radius is increased, the process will proceed to step 840. If it is desired that the bend radius is decreased, the process will proceed to step 846.

An example where the condition $L_{l,m}^{b(2\pi)} \approx L_{l,m}^{e(2\pi)}$ is as follows. For l=3, R=4 cm and $\epsilon$=0.01, $L_{l,m}^{e(2\pi)}$=14 in, while $L_{l,m}^{b(2\pi)}$=20 m. To meet the criterion $L_{l,m}^{e(2\pi)} < 0.01\, L_{l,m}^{b(2\pi)}$, R may be increased to at least $R'=R\,(L_{l,m}^{e(2\pi)}/(0.01\,L_{l,m}^{b(2\pi)}))^{1/2l}$=4 $(14 \times 100/20)^{1/6} \approx 8$ cm. Alternatively, R may be decreased to at least $R'=R(0.01 L_{l,m}^{e(2\pi)}/L_{l,m}^{b(2\pi)})^{1/2l}$ cm=1.7 cm. The final length of the fiber L'=$0.01 L_{l,m}^{e(2\pi)}/2$=0.14 m/2=0.07 m. This radius reduction should not violate the minimum bend radius threshold. Otherwise, we should reject this choice.

Steps 870-902 are provided to further define the mode converter to be created. In the event step 870 follows step 822, we set R'=R (i.e., the selected bend radius from step 810) and L'=L (calculated at steps 802-822). In the event step 870 follows step 862, R' and L' calculated in steps 830-862 will be used.

At step 870, calculate the number of windings N on the spool having bend radius R' needed to accommodate L': N=L'/(2πR'). For example, using the 2π walk-off lengths provided in Table 1, a spool having a radius of 4 cm requires a bend-induced 2π walk-off length $L_{l,m}^{b(2\pi)}$ of 0.146 m. The length of fiber L' used to form the spool can be calculated using L'=½$L_{l,m}^{b(2\pi)}$. Thus, L'=0.073 m. Then. using the relationship. N=L'/(2πR'), the number of turns (or windings) N needed to form the spool is determined to be 0.29 turns. A spool including only a partial winding, such as the spool illustrated in FIG. 9b, could be used to accommodate 0.29 turns. Alternatively, in the event it is desired that the spool is formed with a minimum of one complete turn, U can be adjusted in accordance with the relationship L'=$L_{l,m}^{b(2\pi)}$(n+½), by setting n>1. For example, if we chose n=2, L' can be adjusted which then provides L'=0.365 m. Using the relationship N=L'/(2πR') translates to the requirement of 1.45 turns (i.e, N=1.45 turns). We now have a mode converter with at least one complete winding. Alternatively, if constructing the spool for l=2, we see from Table 1 that the bend-induced 2π walk-off length is 416 m and therefore L'=208 m. Then using the relationship, L'=2πR'N, we find N=832 turns.

At step 871, calculate the maximum number of windings per layer $N_w$, where $N_w$=w/d. For a spool of width w, the maximum number $N_w$ of windings in a single layer around the spool is equal to w/d.

At step 872, compare N and $N_w$.

If at step 872, N<$N_w$, a single spool will accommodate the windings N, at step 873 a single spool of N windings is formed.

Figure 12A:
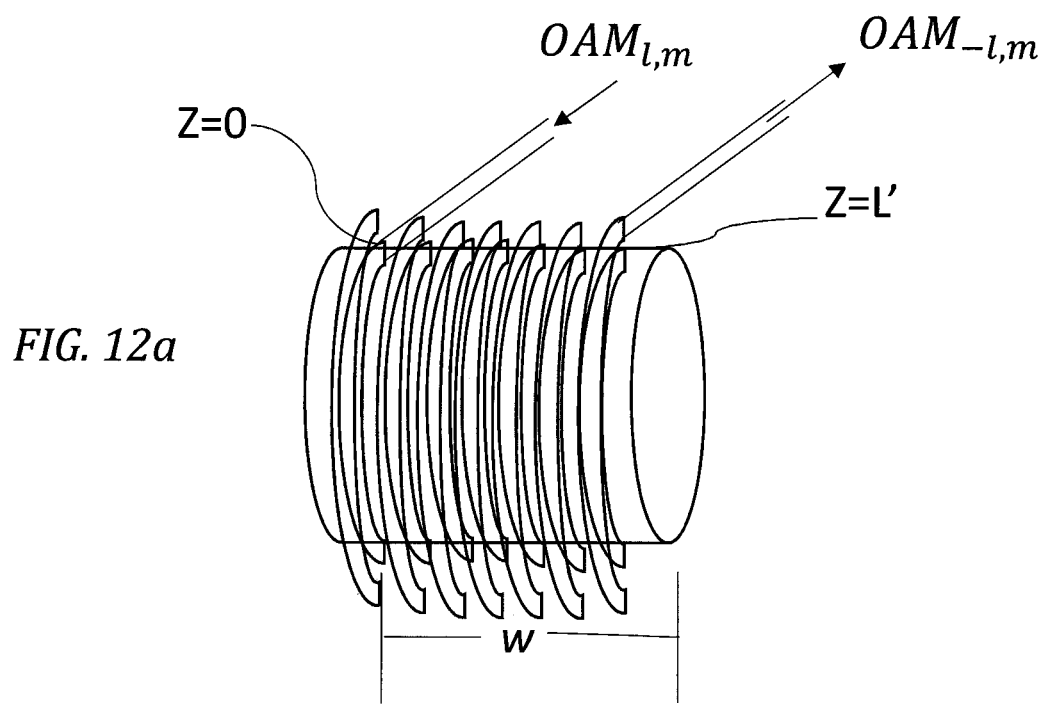
FIG. 12a illustrates a spool created with a bent fiber and having a plurality of winding layers.
Figure 12B:
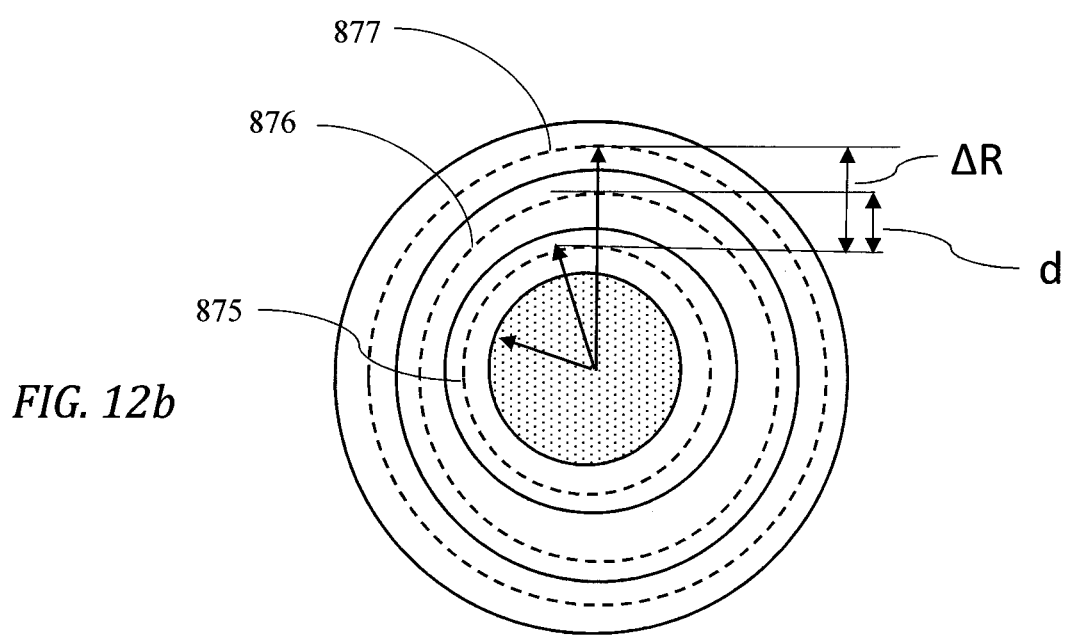
FIG. 12b illustrates an end view of a spool created with a bent fiber and having a plurality of winding layers.

If at step 872 N>$N_w$, insufficient space is provided to accommodate the calculated number of windings in a single layer and as illustrated in FIGS. 12a and 12b, multiple layers of windings may be utilized to accommodate the required length L' of fiber. The spool illustrated in FIG. 12b includes an initial winding layer 875, a second winding layer 876, and a third winding layer 877. As the number of layers increases from unity, the bend radius R' of the spool increases, thereby changing the bend-induced 2π walk-off length, and hence changing the required length L' of the fiber and the number of turns N(=L'/(2πR')). The change in the 2π walk-off length is $\Delta L_{l,m}^{b(2\pi)} = (2l)\,(\Delta R/R')\, L_{l,m}^{b(2\pi)}$ which follows from the proportionality rule: $L_{l,m}^{b(2\pi)} \propto R^{2l}$, where ΔR is the change in the bend radius R' on account of additional number of layers of winding (i.e. the layers exceeding 1), see FIG. 12b. To ensure ΔR remains small, (2π) we impose a limit $\Delta L_{l,m}^{b(2\pi)}/L_{l,m}^{b(2\pi)} \leq \mu$ (a small number, e.g. 0.1). This limits the number of additional layers on the spool. From the relationship, $\Delta L_{l,m}^{b(2\pi)} = (2l)\,(\Delta R/R')\, L_{l,m}^{b(2\pi)}$, the maximum number of additional layers allowed is $n_{la(max)}=\mu\,R/(2ld)$ (rounded to an integer). The maximum number of windings on a single spool $N_s=(n_{la(max)}+1)N_w$. At step 878 the number of windings N is adjusted to N' to account for $\Delta L_{l,m}^{b(2\pi)}$. The increase ΔN in the number of windings N to account for the layering is determined by $$\frac{\Delta N}{N} = \frac{\Delta L}{L} = \Delta L_{l,m}^{b(2\pi)}/L_{l,m}^{b(2\pi)} = (2l)\Delta R/R' = (N_e/N_w)d/R',$$

which then yields $\Delta N/N = (2l)(N_e/N_w)(d/R')$, where $N_e=N-N_w$ is the number of windings in excess of $N_w$. The required number of windings to achieve a conversion to the degenerate mode −l is N'=N+ΔN=N(1+2l($N_e/N_w$)(d/R')).

At step 879 $n_{la(max)}$ is calculated and it is determined whether more than one spool is required to accommodate the layers of windings. If at step 879 it is determined that N'<$N_w$(1+$n_{la(max)}$), one spool is sufficient.

The number of required additional layers on the single spool, denoted $n_{la}$, is equal to (N'/$N_w$), rounded down to the nearest integer. At step 880 $n_{la}$ is calculated. For example, if (N'/$N_w$)=2.7, then $n_{la}$=2, i.e, 2$N_w$ turns will be accommodated fully on the first two layers, and the rest 0.7 $N_w$ on the third (($n_{la}$+1)th layer, implying a total of $n_{la}$+1 layers.

Next at step 881, the remaining windings on the ($n_{la}$+1)th layer equal to N'−$n_{la}N_w$ is calculated.

Next, the process proceeds to step 873 where a single spool having multiple layers of windings is provided The following is an example of a single spool having multiple windings. For w=8 cm, d=250 Nw=320. For the l=2 OAM mode and a bend radius R'=4 cm, we see from Table 1 that $L_{l,m}^{(2\pi)}$=416 m, which implies N=(416/2)/(2π4×10$^{-2}$)≈827. The first layer accommodates 320 turns. The remaining number of turns Ne on additional layers is Ne=N−Nw=827−320=507. To compensate for the increase in radius due to these turns, N is to be adjusted to N'−=N(1+2l(Ne/Nw)(d/R'))=827(1+4(507/320)(0.00025/0.04))=860. The number of additional layers $n_{la}$ needed to accommodate the 860 turns=(N'/Nw)=(860/320)=2 (rounded down integer). The first two layers accommodate 640 turns (=$n_{la}$ $N_w$) and the remaining N'−$n_{la}$ $N_w$=860−2(320)=220 turns reside on the third layer. For μ=0.1, the maximum number of additional layers allowed, $n_{la(max)}$=μR'/(2ld) rounded integer=4. The maximum number of layers allowed on this spool is 1+$n_{la(max)}$=1+4=5. So one spool suffices.

Figure 13:
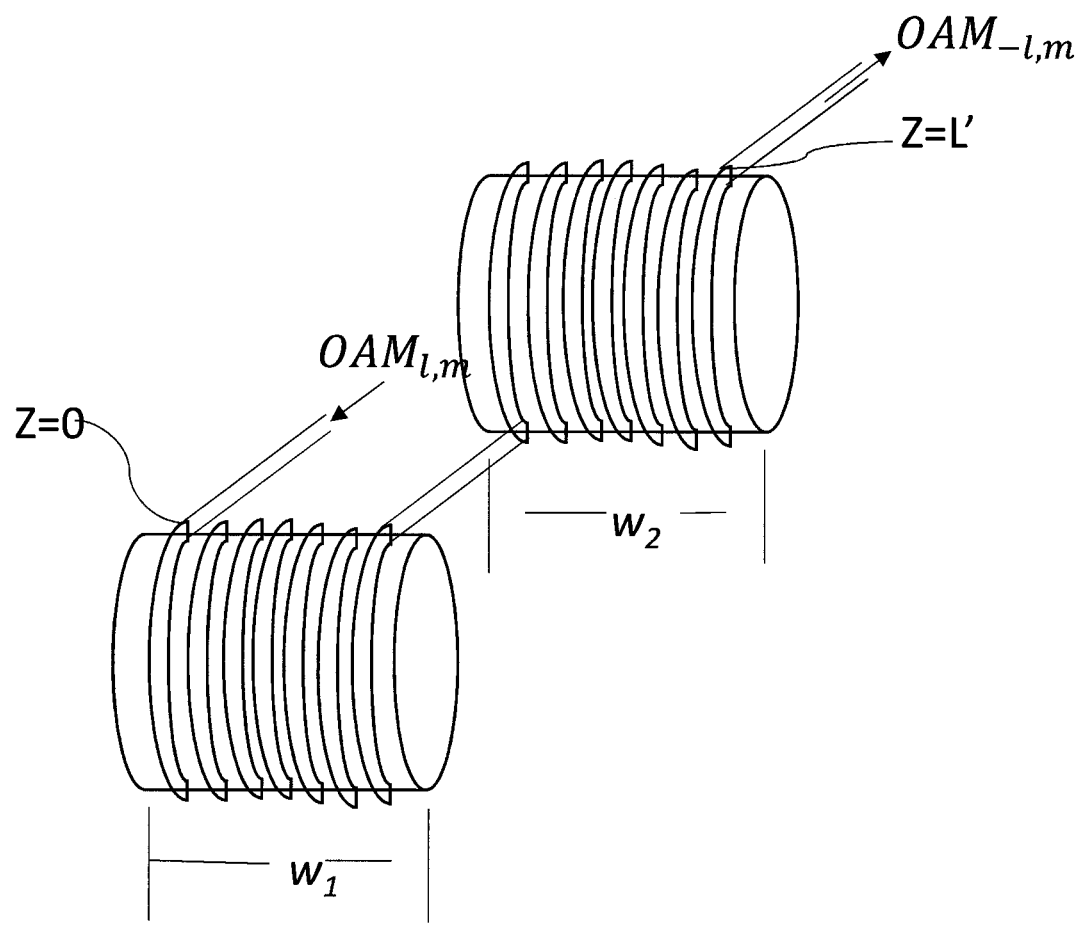
FIG. 13 illustrates two spools in series created with a bent fiber.

If at step 879 it is determined that N'>Nw(1+nla(max)), more than one spool is required. Multiple spools of the same radius R' may be created in series to accommodate the required windings as illustrated in FIG. 13.

To determine the number of spools $n_s$ (assuming same width w) that are required in series, calculate N/($N_w$(1+$n_{la(max)}$/(1+μ))). Round down the result, denoted c, to the largest integer $n_r$<c. The number of windings Au remaining from the initial number N (from step 870) after $n_r$ spools have been fully loaded is Δv=(c−$n_r$) Nw(1+$n_{la(max)}$)/(1+μ)). At step 882, Au is calculated. At step 883, Au is compared with If Δv≤$N_w$, the number of spools required $n_s$ is calculated: at step 884 ($n_s$=$n_r$+1). If Δv>$N_w$, at step 885 calculate the additional number of windings $N_o$=Δv−$N_w$, and at step 886 adjust Δv to Δv=Δv (1+2/($N_o/N_w$)(d/R')) to account for the changing bend-induced 2π walk off length (the fractional change (Δv'−Δv)/Δv=(2l)ΔR/R', where ΔR=($N_o/N_w$)d).

At step 887 compare Δv' with $N_w$ ($n_{la(max)}$)+1). If Δv'<$N_w$ ($n_{la(max)}$)+1), at step 888 the number of required additional layers on the spool, denoted $n_{la}$ is calculated ($n_{la}$=(Δv'/$N_w$), rounded down to the highest integer). At step 889, the number of windings required on the ($n_{la}$+1)th layer is calculated.

If at step 887 Δv'>$N_w$ ($n_{la(max)}$)+1), at step 890 an additional spool is required, i.e., $n_s$=$n_r$+2. Alternatively, to reduce the number of spools, one may increase the width w of the spool.

Another example of spool construction is described using R'=4 cm and l=2. From Table 1 we see that for R'=4 cm and l=2, L'=½$L_{l,m}^{(2\pi)}$=½(416)=208 m. Using the relationship, N=L'/(2πR'), we find that N=827 turns. If the width of the spool is chosen to be w=4 cm, Nw=w/d=160. Ne=N−$N_w$=827−160=667. N'=N(1+2/(Ne/$N_w$d/R')=832(1+4(667/160)(0.00025/0.04))=918. Assuming μ=0.1. $n_{la(max)}$=μ R'/(2ld)=(0.1)(0.04)/(2×20.00025)=4. Compare N' with ($n_{la(max)}$+1) Nw. We find N'>($n_{la(max)}$+1) Nw. So, an additional spool is required. Calculate c=N/($N_w$(1+$n_{la(max)}$/(1+μ)))=827/(160(1+4/1.1))=1.12. $n_r$ (rounded down integer)=1. Δv=(c−$n_r$) $N_w$(1+$n_{la(max)}$/(1+μ))=(1.12−1)160(1+4/1.1)=89. Compare Δv with Nw. Δv<Nw. A single layer to accommodate the 89 remaining windings on the second spool suffices. Alternatively, we may increase the width w of the spool to accommodate the windings on a single spool.

Figure 14:
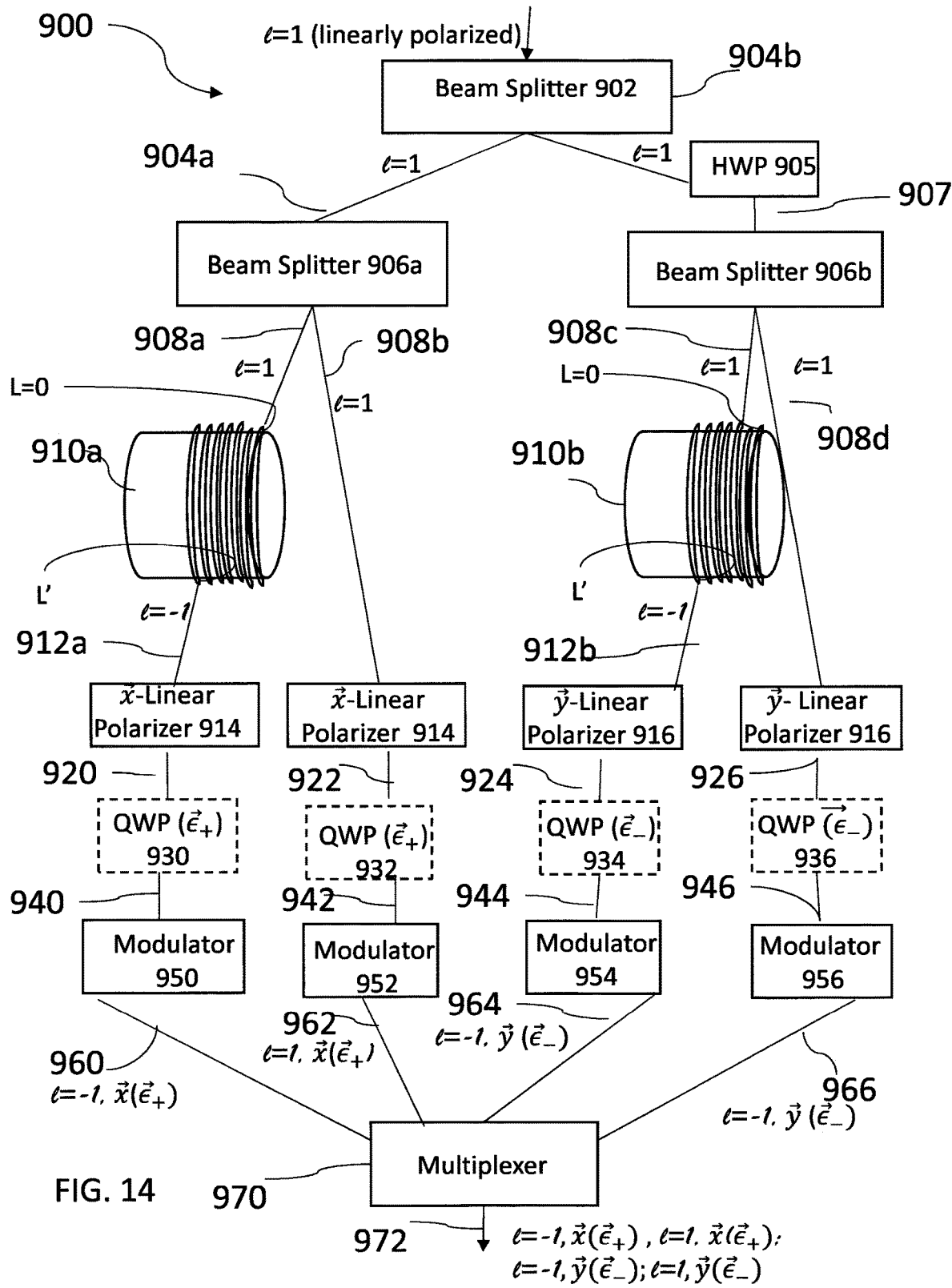
FIG. 14 illustrates a system including the mode converter of the present invention.

A system 900 implementing the mode converter of the present invention is illustrated in FIG. 14. The system includes a 50:50 beam splitter 902 which receives a linearly polarized l=1 OAM mode of wavelength X on a fiber. The polarized light beam received by a 50:50 beam splitter 902 includes x and y components of the linearly polarized light. The 50:50 beam splitter 902 produces beams 904a and 904b. Beam 904a is directed to additional 50:50 beam splitter 906a. Beam 904b is directed to half wave plate (HWP) 905 wherein the polarization of the beam changes to become orthogonal to the polarization of beam 904a. The orthogonal beam 907 is then directed to additional 50:50 beam splitter 906b. Additional 50:50 beam splitter 906a splits the beam into a first beam 908a and a second beam 908b. Additional 50:50 beam splitter 906b splits the beam into a first beam 908c and a second beam 908d.

Each first beam 908a, 908c is directed over a mode converter 910a, 910b of length L'. The length L' of the fiber is determined as discussed above from the 2π walk-off length for the said OAM mode and the other spool constraints. A component 912a, 912b is provided at the output of each mode converter 910a, 910b. As discussed above, the passage of the light through the spools 910a, 910b converts the component of light having topological charge l received by the spool 910a, 910b to its degenerate partner characterized by a topological charge Although mode converter 910a is illustrated as a single spool, multiple spools may be provided in series to receive and convert the component of light 908a having topological charge l to its degenerate partner 912a characterized by a topological charge −l. Likewise, although mode converter 910b is illustrated as a single spool, multiple spools may be provided in series to receive and convert the component of light 908c having topological charge l to its degenerate partner 912b characterized by a topological charge −l. The number of spools used to provide the conversion is determined in accordance with the design considerations described above. As illustrated in FIG. 14, components 908b and 908d are provided on a straight fiber and therefore no conversion of the topological charge of components 908b and 908d is provided.

Component 908b is provided to a linear polarizer 914 providing polarization in the x-direction, to produce an x-linearly polarized component 922 having topological charge l. X-linearly polarized component 922 is then optionally provided to a quarter wave plate (QWP) providing left-circular polarization to component 922. Component 912a is provided to a linear polarizer 914 providing polarization in the x-direction, to produce an x-linearly polarized component 920 having topological charge −l. X-linearly polarized component 920 is then optionally provided to a quarter wave plate (QWP) providing left-circular polarization to component 920 to provide a, left-circularly polarized component 940 having topological charge −l. Component 908d is provided to a linear polarizer 916 providing polarization in the y-direction, to produce a y-linearly polarized component 926 having topological charge l. Y-linearly polarized component 926 is then optionally provided to a quarter wave plate (QWP) providing right-circular polarization to component 926 to provide a right-circularly polarized component 946 having topological charge l. Component 912b is provided to a linear polarizer 916 providing polarization in the y-direction, to produce a y-linearly polarized component 924 having topological charge −l. Y-linearly polarized component 924 is then optionally provided to a quarter wave plate (QWP) providing right-circular polarization to component 924 to provide a right-circularly polarized component 944 having topological charge −l.

Modulators 950, 952, 954 and 956 receive the linearly polarized or optionally circularly polarized components 940, 942, 944, 946 respectively. Each component is modulated to carry data traffic of a certain bandwidth as permitted by the characteristics of the fiber. The modulated signals 960, 962, 964, 966 are brought together by a multiplexer 970 and provided to a first end of a transmission fiber 972 which may have characteristics similar to or different from the characteristics of the fiber used to form the mode converter. The multiplexed modulated signals will be linearly polarized ($\vec{x}$, $\vec{y}$)) or circularly polarized ($\vec{e}_+, \vec{e}_-$) depending upon whether only linear polarizers 914, 916 are used or whether linear polarizers 914, 916 are used on combination with quarter wave plates 930, 932, 934, 936. The multiplexed modulated signals are transmitted to the opposite end of the transmission fiber and provided to a demultiplexer (not illustrated). The demultiplexer recovers each of the modulated signals and a demodulator (not illustrated) is used to recover the individual data streams.

Several advantages are provided by the invention. Instead of using a straight (slightly) elliptical fiber as a mode converter, which would be unwieldy as the required calculated fiber length could run into hundreds of meters and even kilometers depending upon the ellipticity value and topological charge; this invention achieves conversion of the topological charge using a spool of a certain radius R of a few centimeters to wind the fiber on.

The invention provides a mode converter which is constructed using readily available, inexpensive components and eliminates the need for a cumbersome arrangement of mirrors currently employed to convert topological charge +1 to −1.

Currently, a COMSOL tool is used to perform the calculation of the 2π walk-off length. The calculation requires enormous computational time. Specification changes requiring the 2π walk-off length to be recalculated is therefore prohibitively time consuming in the design process. The invention provides a mode converter whose design can be easily manipulated as system requirements change. For example, when bend radius R of the spool needs to be adjusted, a new 2π walk-off length is readily recalculated using the proportionality relationships described above, conserving considerable computational time. This new 2π walk-off length allows us to easily to determine a new length of fiber L' needed to form the spool.

While embodiments of the present invention are shown and described, it is envisioned that those skilled in the art may devise various modifications of the present invention without departing from the spirit and scope of the described invention.

What is claimed is:

1. A method of converting an angular momentum mode of light, comprising the steps of:
   providing an optical fiber having a first end, a second end, and a core radius a;
   identifying a wavelength λ, a topological charge l and a radial index m of an orbital angular momentum mode of a light source to be applied to the first end of the optical fiber;
   determining a bend radius R of the optical fiber;
   determining a bend-induced 2π walk-off length $L_{l,m}^{b(2\pi)}$;
   determining a length L of the optical fiber defined by ½ the bend-induced 2π walk-off length $L_{l,m}^{b(2\pi)}$;
   bending the optical fiber to form a spool with the optical fiber having the bend radius R, length L, and including at least a portion of a winding, and wherein a number of windings N is defined by L/(2πR);
   applying the light source to the first end of the bent optical fiber, and
   wherein the light at a second end of the bent optical fiber light has an orbital angular momentum mode of topological charge −1, and a radial index m.

2. Method of claim 1 wherein the bend-induced 2π walk-off length is determined by:

$$L_{l,m}^{b(2\pi)} = \frac{2\pi}{\Delta \beta'_{l,m}};$$

wherein $\Delta \beta'_{l,m} = \beta'_{l,m}{}^+ - \beta'_{l,m}{}^-$ is the difference in the propagation constants $\beta'_{l,m}{}^+$ and $\beta'_{l,m}{}^-$ and wherein $\beta'_{l,m}{}^+$ and $\beta'_{l,m}{}^-$ are propagation constants of eigenmodes of the bent optical fiber for the specified topological charge l and radial index m.

3. The method of claim 2, wherein $\Delta \beta'_{l,m}$ is defined by, $$\Delta \beta'_{l,m} = \frac{\Delta \beta'^2_{l,m}}{2\beta_{l,m}};$$

where $$\Delta \beta'^2_{l,m} = 2\sigma^{2l} \Sigma \frac{\delta H_{(0,j)(-1,p)} \cdots \delta H_{(-l+2,r)(-l+2,s)} \delta H_{(-l+2,s)(-l,m)}}{(\beta^2_{l,m} - \beta^2_{-1,n})(\beta^2_{l,m} - \beta^2_{l-2,k}) \cdots} \frac{\delta H_{(l,m)(l-1,n)} \delta H_{(l-1,n)(l-2,k)} \cdots \delta H_{(1,i)(0,j)}}{(\beta^2_{l,m} - \beta^2_{0,j}) \cdots (\beta^2_{l,m} - \beta^2_{-l+2,r})(\beta^2_{l,m} - \beta^2_{-l+2,s})},$$

where the summation includes all radial mode solutions for all topological charges related by a selection rule, Δl=±1 except for the topological charges l and −l, for which the radial index m is fixed;

where a perturbation parameter σ is provided by a/R;

where a number of bend-induced matrix elements in the numerator is 2l+1; and where a number of propagation constant-squared differences in the denominator is 2l.

4. The method of claim 1, further comprising the step of:
   determining an ellipticity-induced 2π walk-off length of the fiber $L_{l,m}^{e(2\pi)}$;
   providing a comparison of the bend-induced 2π walk-off length $L_{l,m}^{b(2\pi)}$ to the ellipticity-induced 2π walk-off length of the fiber $L_{l,m}^{e(2\pi)}$;
   wherein prior to the step of forming the spool, the length L of the optical fiber is adjusted to L' and the bend radius R is adjusted to R' based upon the comparison and the number of windings N is defined by L'/(2πR').

5. The method of claim 4 wherein the comparison provides that $L_{l,m}^{e(2\pi)} < L_{l,m}^{b(2\pi)}$ and the bend radius R is increased to R', wherein R' is defined by R'=$(L_{l,m}^{e(2\pi)}/(0.01 L_{l,m}^{b(2\pi)}))^{(1/2l)}$ R; and L is set L', wherein L' is defined by L'=$L_{l,m}^{e(2\pi)}$/2.

6. The method of claim 4 wherein the comparison provides that $L_{l,m}^{b(2\pi)} < L_{l,m}^{e(2\pi)}$ and the bend radius R is decreased R', wherein R' is defined by R'=$L_{l,m}^{e(2\pi)}$/(0.01 $L_{l,m}^{e(2\pi)}))^{-(1/2l)}$R and L is set to L', wherein L' is defined by L'=0.01$L_{l,m}^{e(2\pi)}$/2.

7. The method of claim 4 wherein the comparison provides that $L_{l,m}^{e(2\pi)} \approx L_{l,m}^{b(2\pi)}$ and the radius of the bend R is increased to R', wherein R' is defined by R'=$(L_{l,m}^{e(2\pi)}/(0.01L_{l,m}^{b(2\pi)}))^{(1/2l)}$ R and L is set to L', wherein L' is defined by L'=$L_{l,m}^{e(2\pi)}$/2.

8. The method of claim 4 wherein the comparison provides that $L_{l,m}^{e(2\pi)} \approx L_{l,m}^{b(2\pi)}$ and the radius of the bend R is decreased to R', wherein R' is defined by R'=R'=$(L_{l,m}^{b(2\pi)}/(0.01 L_{l,m}^{e(2\pi)}))^{-(1/2l)}$R and L is set to L', wherein L' is defined by L'=0.01$L_{l,m}^{e(2\pi)}$/2.

9. The method of claim 1, wherein multiple layers of windings are provided on the spool.

10. The method of claim 1, wherein the length L of fiber is apportioned between multiple spools.

11. The method of claim 1, wherein the fiber has an index profile f(r).

12. The method of claim 11, wherein f(r) is a step function, corresponding to a step index fiber.

13. The method of claim 11, wherein f(r) is a step function, corresponding to a gradient index fiber.

14. A device for converting light having an angular momentum mode of topological charge l, and a radial index m into a light having an angular momentum mode of topological charge −l, and a radial index m; comprising:
 a spool of optical fiber having a length L,
 the spool having a bend radius R, and a number of windings N,
 wherein length L is defined by ½ the bend-induced $2\pi$ walk-off length $L_{(l,m)}^{b(2\pi)}$, and wherein the number of windings N is defined by $L/(2\pi R)$.

15. The device of claim 14, wherein the length L is adjusted to account for ellipticity-induced $2\pi$ walk-off length of the fiber $L_{l,m}^{e(2\pi)}$.

16. The device of claim 15, wherein $L_{l,m}^{e(2\pi)} < L_{l,m}^{b(2\pi)}$, and the radius of the bend R is increased to R', wherein R' is defined by $R'=(L_{l,m}^{e(2\pi)}/(0.01L_{l,m}^{b(2\pi)}))^{(1/2l)}R$; and L is set L', wherein L' is defined by $L'=L_{l,m}^{e(2\pi)}/2$.

17. The device of claim 15, wherein $L_{l,m}^{b(2\pi)} < L_{l,m}^{e(2\pi)}$, and the radius of the bend R is decreased to R', wherein R' is defined by $R'=L_{l,m}^{b(2\pi)}/(0.01L_{l,m}^{e(2\pi)}))^{-(1/2l)}R$ and L is set to L', wherein L' is defined by $L'=0.01L_{l,m}^{e(2\pi)}/2$.

18. The device of claim 15, wherein $L_{l,m}^{e(2\pi)} \approx L_{l,m}^{b(2\pi)}$, and the radius of the bend R is increased to R', wherein R' is defined by $R'=L_{l,m}^{e(2\pi)}/(0.01L_{l,m}^{b(2\pi)}))^{(1/2l)}$ R and L is set to L', wherein L' is defined by $L'=L_{l,m}^{e(2\pi)}/2$.

19. The device of claim 15, wherein $L_{l,m}^{e(2\pi)} \approx L_{l,m}^{b(2\pi)}$, and the radius of the bend R is decreased to R', wherein R' is defined by $R'=(L_{l,m}^{b(2\pi)}/(0.01L_{l,m}^{e(2\pi)}))^{-(1/2l)}R$ and L is set to L', wherein L' is defined by $L'=0.01L_{l,m}^{e(2\pi)}/2$.

20. A system for transmitting data on an optical fiber comprising:
 a first modulator receiving light from a first optical fiber, the light having an angular momentum mode of topological charge l and a radial index m to provide a first data signal having a topological charge I;
 a second optical fiber provided by a spool having a length L defining a first end and a second end, the spool having a bend radius R, and a number of windings N,
 wherein length L is defined by ½ of the bend-induced $2\pi$ walk-off length $L_{l,m}^{b(2\pi)}$, and wherein the number of winding N is defined by $L/(2\pi R)$;
 wherein light having an angular momentum mode of topological charge l and a radial index m is received at the first end of the second optical fiber, and wherein light having an angular momentum mode of topological charge −l and a radial index m is provided at the second end of the optical fiber;
 a second modulator optically connected to the second end of the second optical fiber to provide a second data signal having a topological charge −l; and
 a multiplexer for multiplexing said first and second data signals.

21. The system of claim 20, wherein the length L is adjusted to account for ellipticity-induced $2\pi$ walk-off length of the fiber $L_{l,m}^{e(2\pi)}$.

22. The system of claim 20, further comprising polarizers optically connect to each of the optical fibers.

23. The system of claim 22, further comprising a quarter wave plate optically connected to each polarizer.

* * * * *